July 24, 1956 — E. H. DREHER ET AL — 2,755,860
DUPLICATING PUNCH AND FIELD SELECTION AND KEYBOARD CONTROL
Filed Sept. 25, 1952 — 16 Sheets-Sheet 1

*INVENTORS*
ELMER H. DREHER
HAROLD P. MIXER
BY
ATTORNEYS

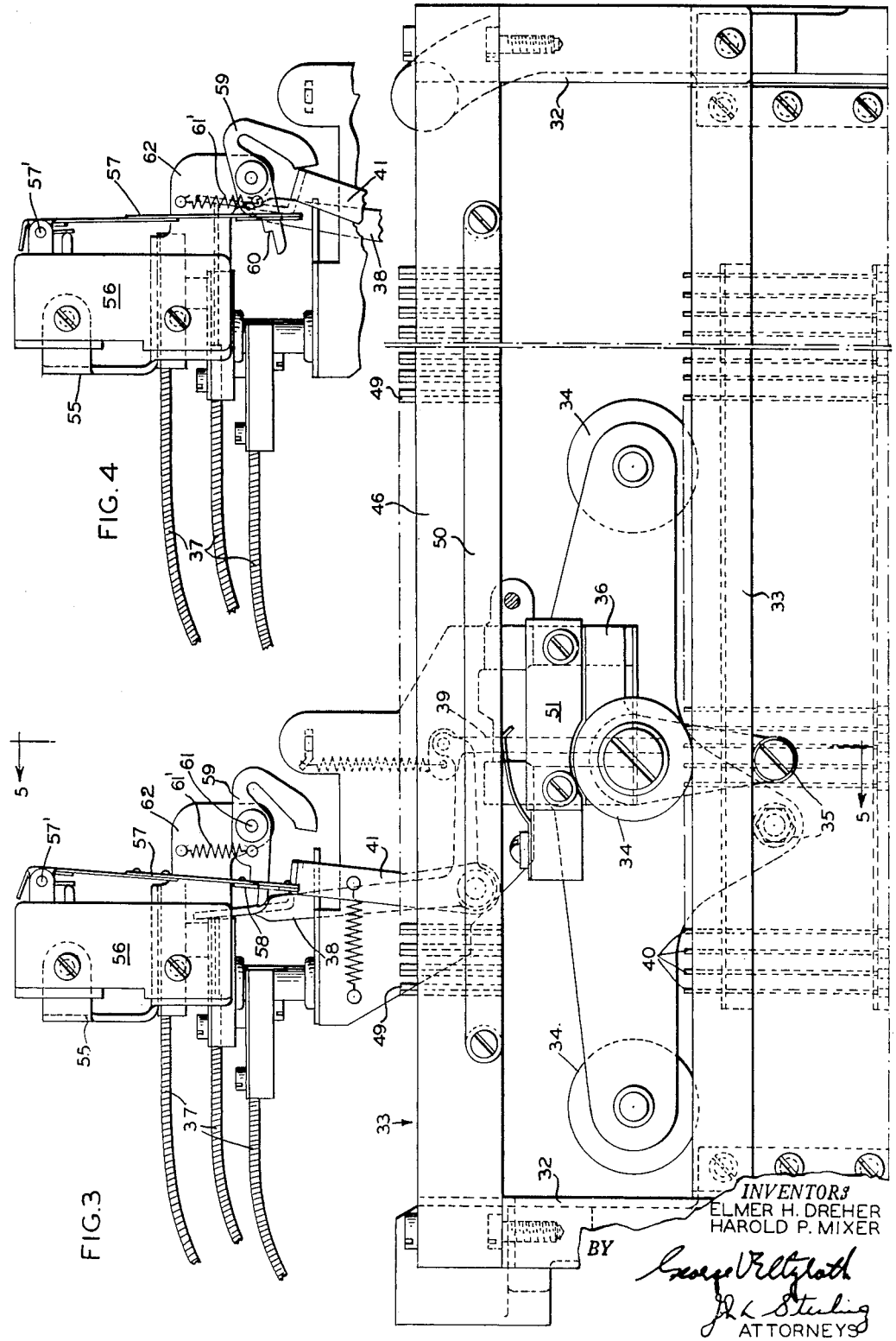

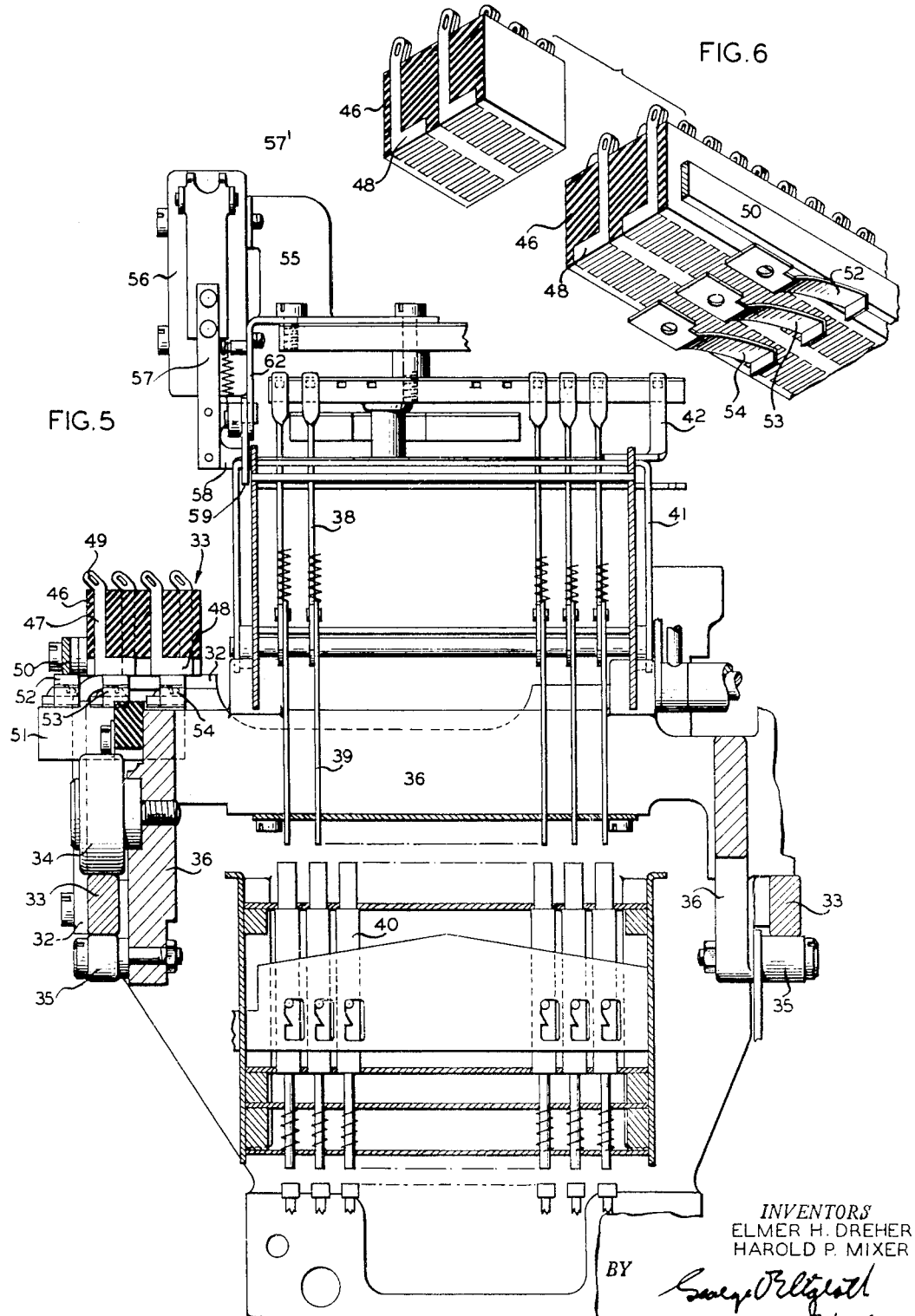

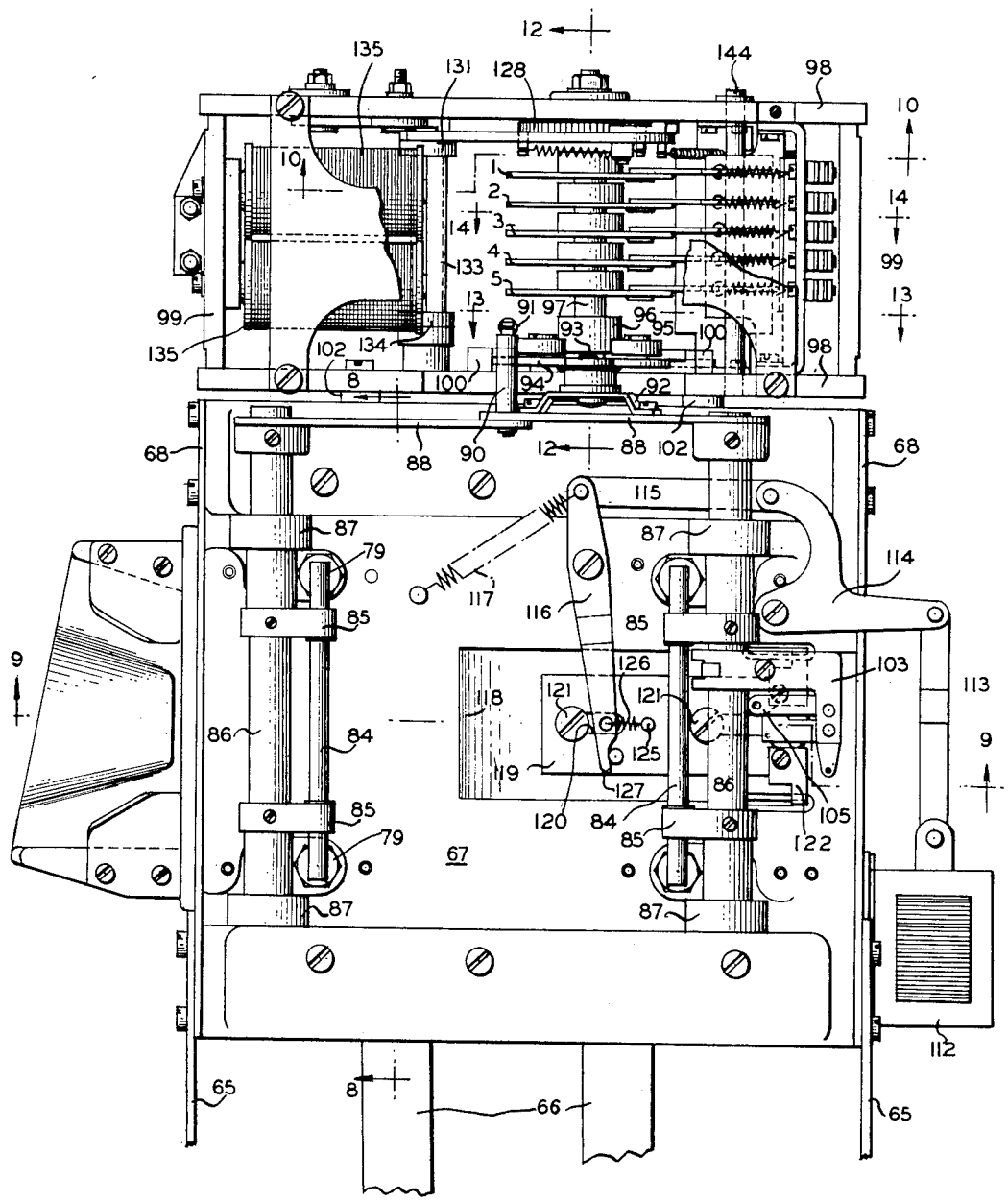

July 24, 1956     E. H. DREHER ET AL     2,755,860
DUPLICATING PUNCH AND FIELD SELECTION AND KEYBOARD CONTROL
Filed Sept. 25, 1952                                    16 Sheets-Sheet 5
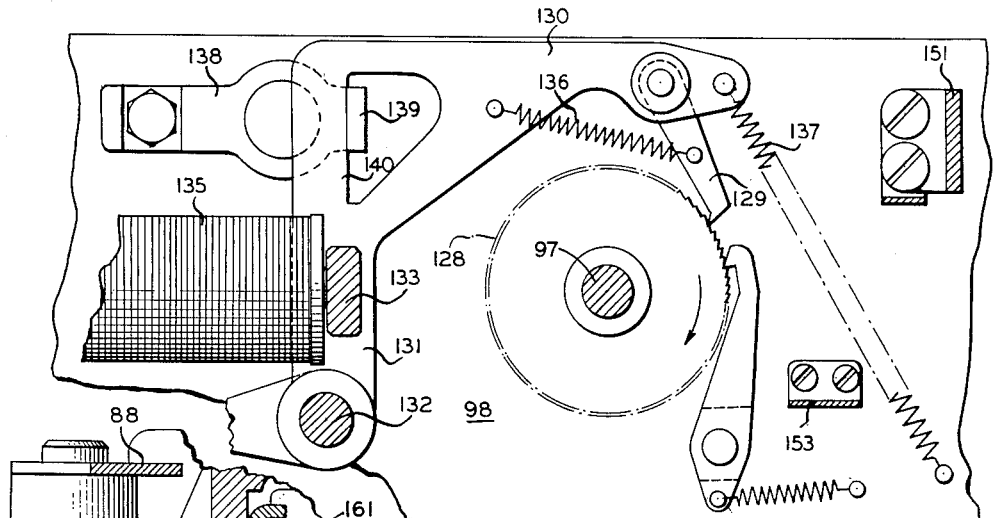
FIG.10
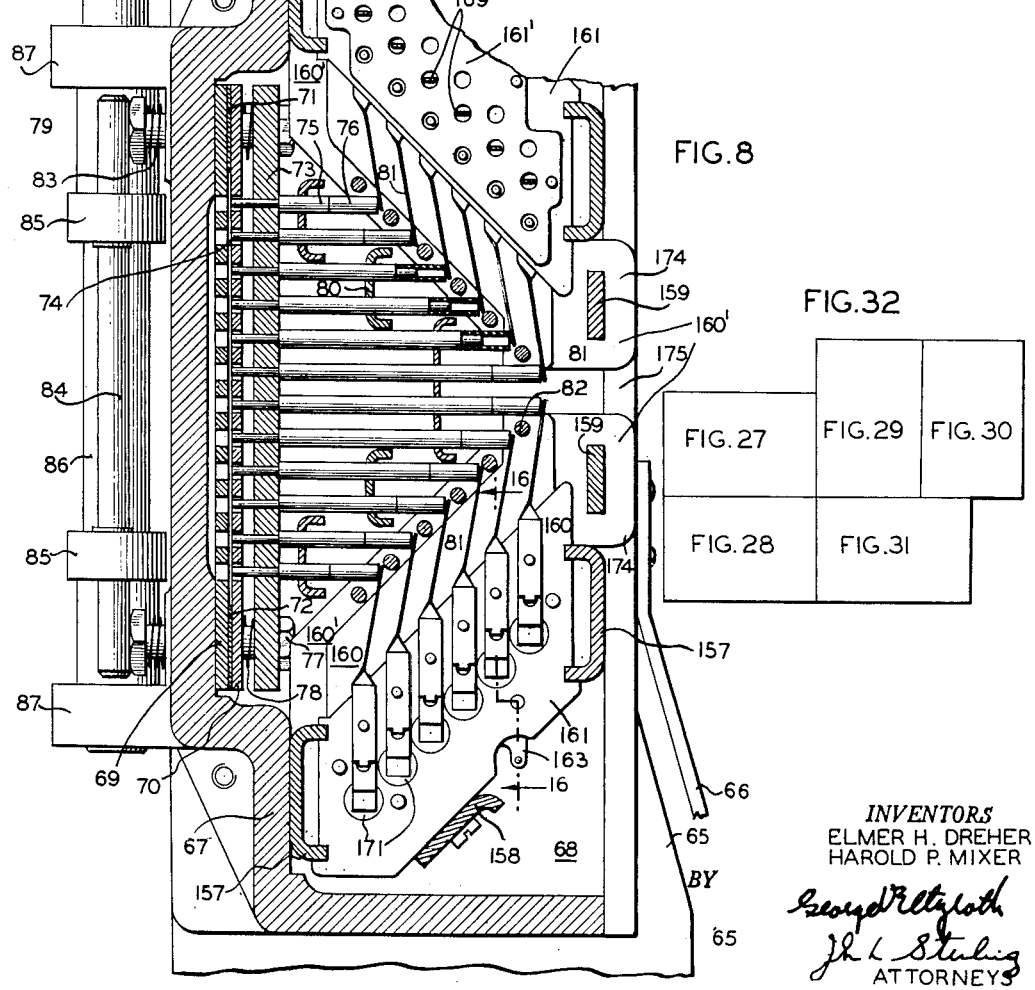
FIG.8
FIG.32
| FIG.27 | FIG.29 | FIG.30 |
| --- | --- | --- |
| FIG.28 | FIG.31 | |
*INVENTORS*
ELMER H. DREHER
HAROLD P. MIXER
BY
ATTORNEYS

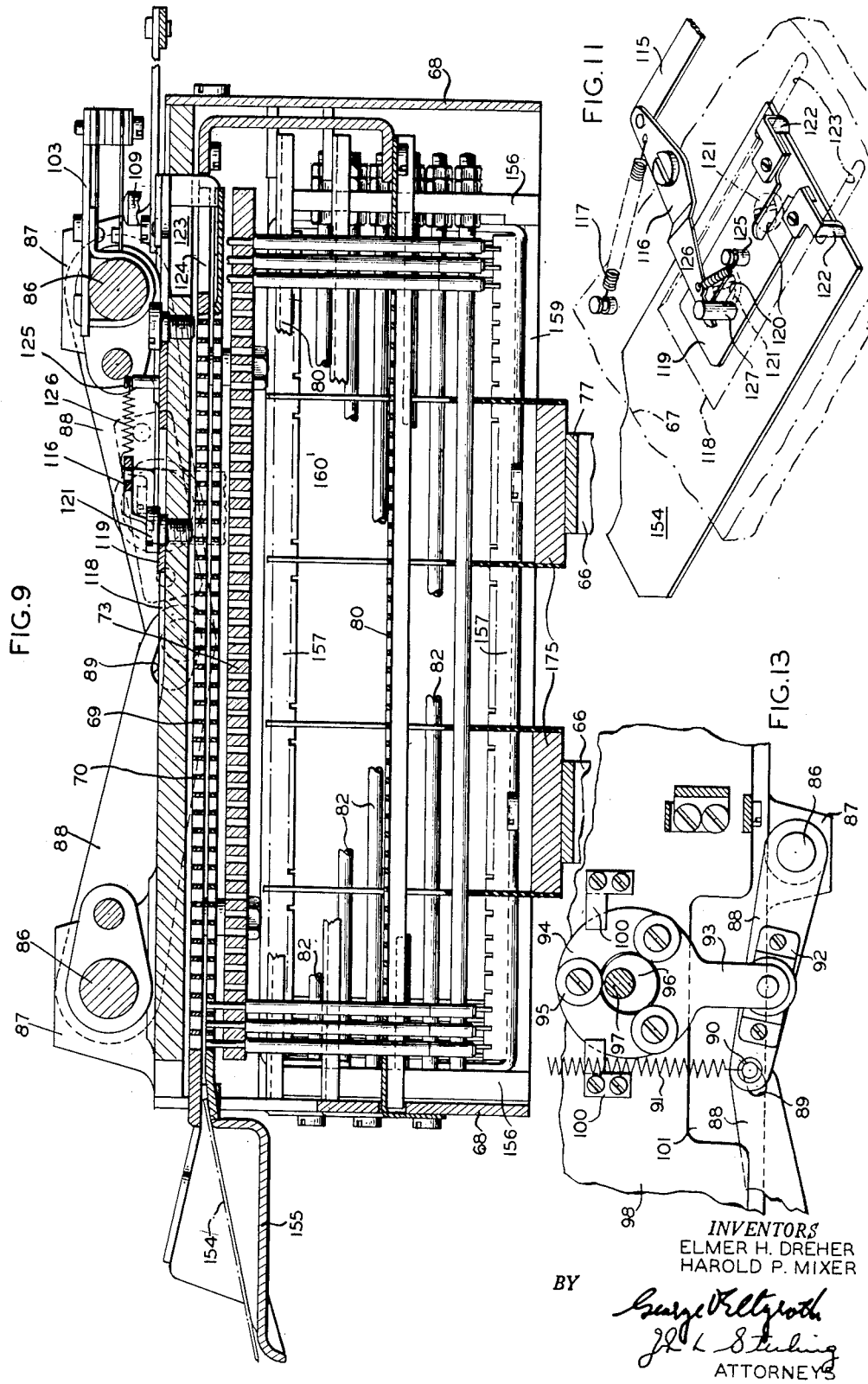

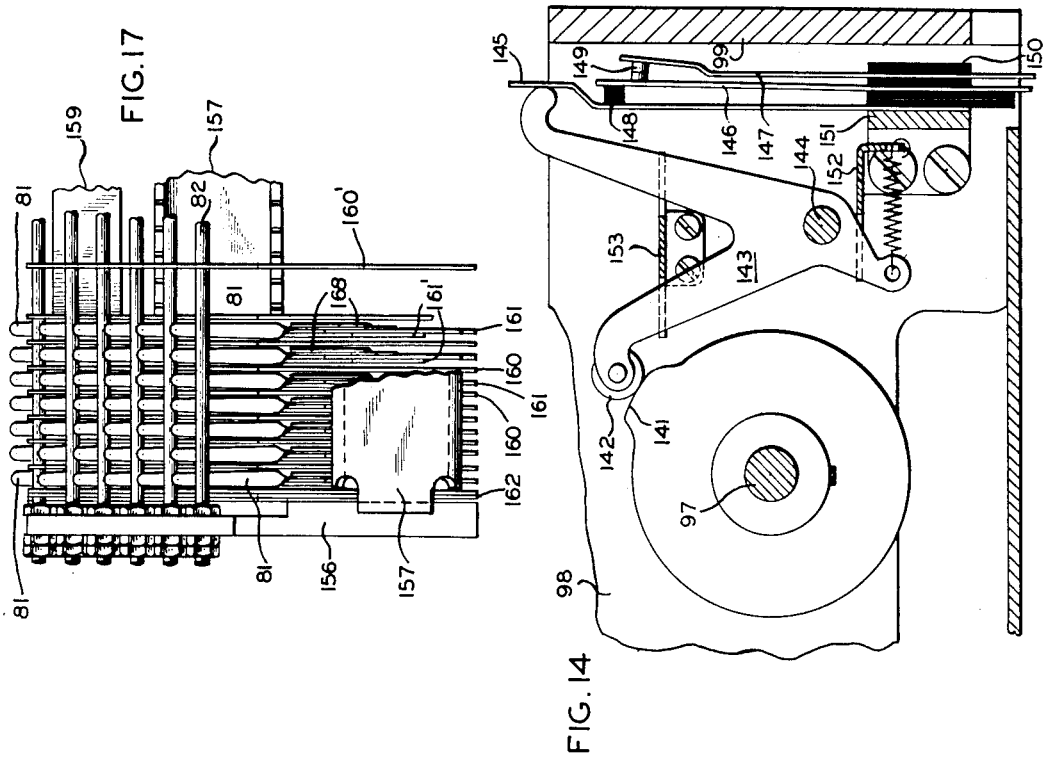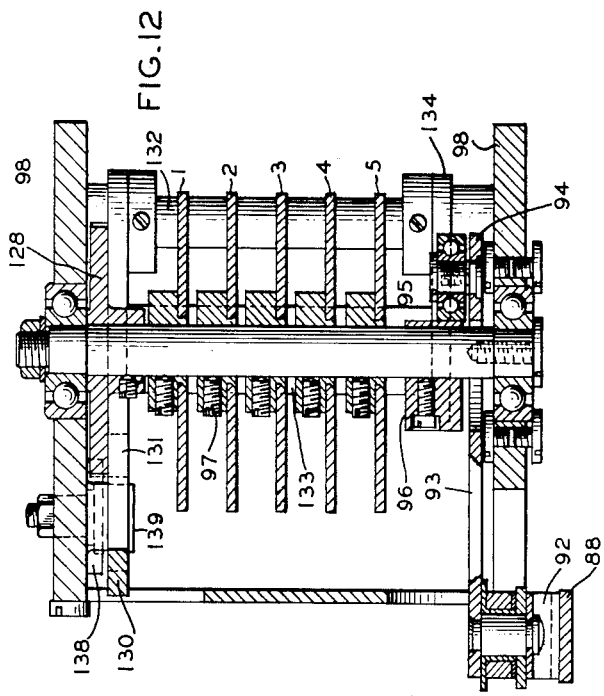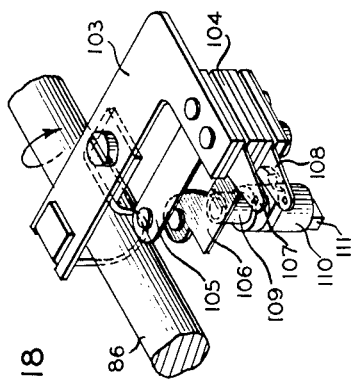

July 24, 1956  E. H. DREHER ET AL  2,755,860
DUPLICATING PUNCH AND FIELD SELECTION AND KEYBOARD CONTROL
Filed Sept. 25, 1952  16 Sheets-Sheet 8
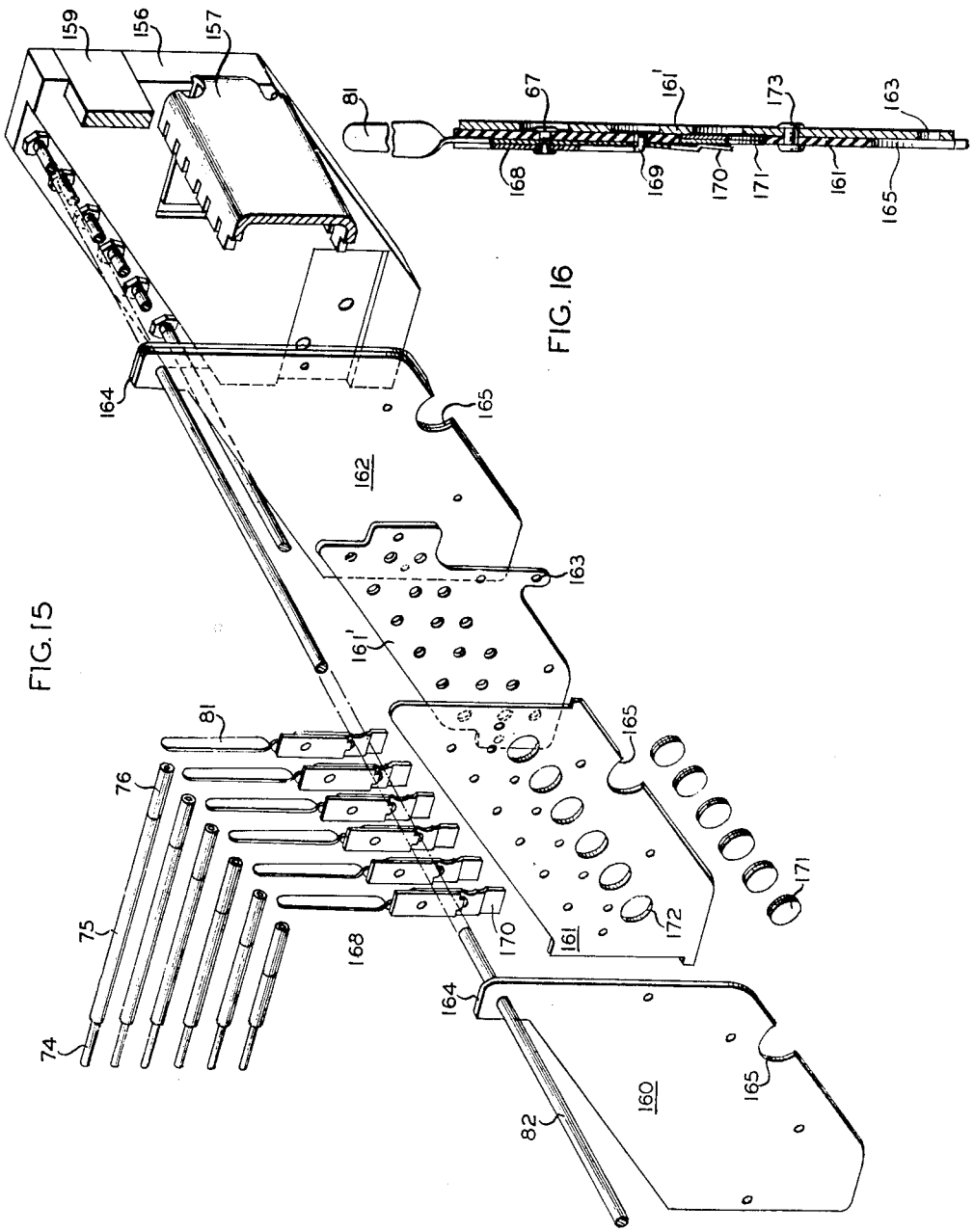
INVENTORS
ELMER H. DREHER
HAROLD P. MIXER
BY
ATTORNEYS July 24, 1956 E. H. DREHER ET AL 2,755,860
DUPLICATING PUNCH AND FIELD SELECTION AND KEYBOARD CONTROL
Filed Sept. 25, 1952 16 Sheets-Sheet 9

INVENTORS
ELMER H. DREHER
HAROLD P. MIXER
BY
ATTORNEYS

July 24, 1956 — E. H. DREHER ET AL — 2,755,860
DUPLICATING PUNCH AND FIELD SELECTION AND KEYBOARD CONTROL
Filed Sept. 25, 1952 — 16 Sheets-Sheet 10

*INVENTORS*
ELMER H. DREHER
HAROLD P. MIXER
BY
ATTORNEYS

July 24, 1956     E. H. DREHER ET AL     2,755,860
DUPLICATING PUNCH AND FIELD SELECTION AND KEYBOARD CONTROL
Filed Sept. 25, 1952     16 Sheets-Sheet 11

INVENTORS
ELMER H. DREHER
HAROLD P. MIXER
BY
ATTORNEYS

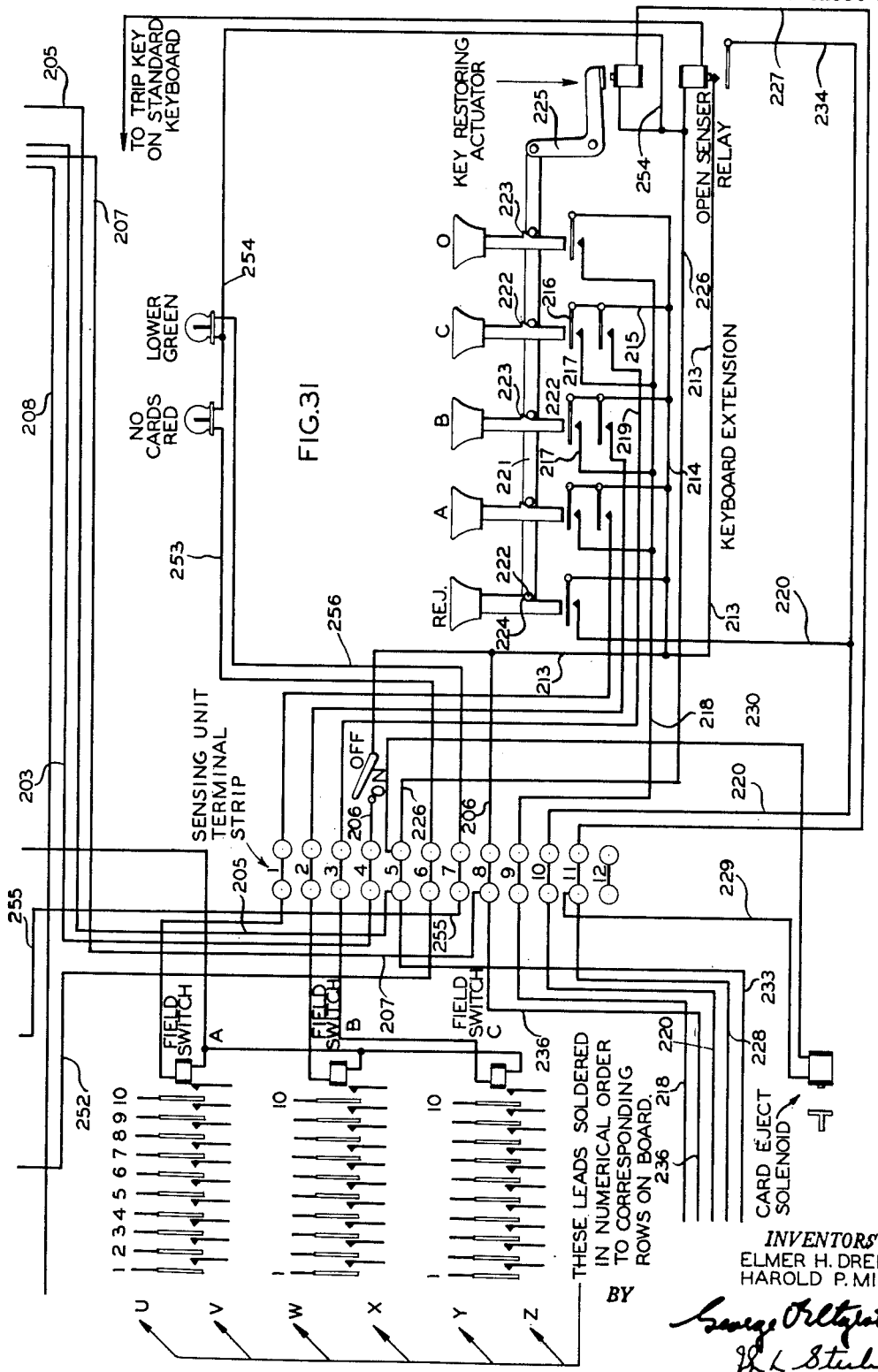

United States Patent Office 2,755,860
Patented July 24, 1956

2,755,860

DUPLICATING PUNCH AND FIELD SELECTION AND KEYBOARD CONTROL

Elmer H. Dreher, East Norwalk, and Harold P. Mixer, South Norwalk, Conn., assignors to Sperry Rand Corporation, a corporation of Delaware Application September 25, 1952, Serial No. 311,522

31 Claims. (Cl. 164—113)

This invention relates to new and useful improvements in reproducing tabulating card punches using also an Alpha-Numeric keyboard.

A main object of the invention is to provide an efficient mechanism whereby a standard punch may be operated from a remote keyboard and possesses the additional ability to automatically duplicate, from a remote sensing unit, on detail cards, all or partial information from master cards.

Another object is to provide a combination of mechanisms whereby the punch keyboard may be placed in a location convenient to a record file housing the master cards and cooperate with a sensing unit into which the master cards may be placed for gang sensing thereof.

Still another object is to provide a combination of mechanisms whereby the data thus sensed from the master cards may be introduced into the punching device column by column.

Yet another object is to provide a combination of mechanisms whereby data from a selected field on the master cards may be automatically punched into a predetermined field on the detail card being punched.

A further object is to provide a combination of mechanisms whereby individual punched detail cards may be produced containing variable information, by operation of the remote standard keyboard, in addition to that automatically sensed from the master card.

Yet another object is to provide a combination of mechanisms and circuits whereby a master card may be used for sensing data by gang operation and for transferring the data to a detail card and also for programming the operation of the punch.

Still another object is to provide a combination of mechanisms and circuits whereby a standard punch is employed which may be operated for normal punching operations by its remote keyboard and is associated with a sensing unit to gang sense master cards and to transfer the sensed data to detail cards.

A further object is to provide a cmobination of mechanisms and circuits whereby the standard keyboard together with the sensing unit and its control keyboard may be rmeoved from the punch proper any desired distance so as to be conveniently disposed with relation to a master card file of any desired type.

Still another object is to provide mechanisms and circuits whereby any selected columns of the master card being sensed may be spaced over at the will of the operator.

Further and more specific objects, features, and advantages will more clearly appear from a consideration of the annexed specification especially when taken in connection with the accompanying drawings which illustrate present preferred forms which the invention may assume and which form part of the specification.

A general consideration of the invention will reveal that the operator is disposed at a convenient location and that in front of her is a sensing unit having a regular Alpha-Numeric punch keyboard as well as a special sensing unit control keyboard. These keyboards are mounted on the front of a casing in which are disposed sensing contact blocks for the 540 positions of a standard 90 column card, a block each for the upper and lower zones of the card. Each block includes 270 contact leaf springs adapted to contact, in groups of 45 springs, with a common contact or rod for each respective group. In view of the multiplicity of circuits thus related and to prevent feedbacks a bi-metal button or other convenient rectifying means is disposed on the support for each spring and in contact with its respective spring so that current will flow in one direction only.

Each spring is held by a sensing pin out of contact with its common rod and these 540 pins are moved back and forth by suitable means such as an oscillating type of magnetic motor turning a shaft supporting a cam for moving the pins and a series of circuit power-controlling cams operating in timed relation as will be later explained in detail. A master card to be sensed in inserted into a slot adjacent the series of pins when they are at one side thereof and when the pins are moved across the slot those encountering holes in the card will move far enough for the released contact spring to contact its common rod and make a circuit. As will later be described these circuits include primary relays which operate to energize secondary relays which in turn operate the punch magnets.

This sensing units senses alphabetical and numerical codes, or in fact, any combination of punching for duplication. A sensing unit On-Off switch controls the flow of current through the unit. When this switch is On the sensing unit is active. When this switch is Off the sensing unit is inactive despite the setting of any other control. While the punch carriage is automatically spacing from column to column for duplicating purposes, the punch key board is rendered inactive. When the punch carriage comes to rest on a blank column of the master card, the punch keyboard becomes active. At this time any key or control may then be manipulated for whatever purpose desired, usually the insertion of variable information.

After all desired information is set into the punch, the Trip key of the punch is depressed and the following operations take place simultaneously:

1. The punch performs its trip operation.
2. The sensing unit circuit is automatically opened. The master card is partially ejected a sufficient distance so that it may readily be picked out by the operator.

A Reject key on the control keyboard provides an optional means for ejecting the master card from the sensing unit. A depression of this key, before the sensing pins are moved in, serves both to disconnect the sensing unit and to eject the master card without punching the detail card. The keyboard may then be operated at will to set up the additional information for the detail card.

On the control keyboard are disposed a plurality of Field Selection Keys which may be marked A, B, C, etc., each related to one of the possible fields on the master card. A depression of one of these keys permits the operator to select which one of these fields will be active to be automatically duplicated from the master card into a particular detail card. These fields generally may relate to article prices. When one field is selected the remainder are automatically made inactive. This depression of the field keys also serves to start the duplicating feature into operation once the master card has been inserted into the sensing unit. They therefore serve the dual purpose of field selection and of starting. The circuits of these keys are opened after the detail card is punched, through the use of the punch Trip Key or if the Reject Key is operated. A Non-Select key is also mounted on the control board and serves for starting purposes only. This key is depressed to start the duplicating operation for the detail card when the application does not involve Field Selection, or the application involves Field Selection, but none of these fields controlled by keys A, B, and C is to be selected for any particular detail card.

Another feature of the invention has to do with what is generally nominated as a Plug Board and which is the means by which the individual columns of the master card in the sensing unit may be connected to the columns desired for automatic punching into the detail cards. It also contains means for allowing or preventing automatic spacing of the punch carriage when a blank or unconnected column of the master card is sensed. As shown the plug board is disposed preferably on the lower right side of the punch as viewed from the front and is divided into four major sections, as follows:

1. *45 Carriage space switches,* which, when pushed in, connect to the space magnet of the punch, and which are mutually effective for opposing Upper and Lower card columns.

2. *Punch connections.*—90 connections are provided for the card columns of the detail card into which information sensed from the master card is to be punched. These connections form the upper four rows on the board. Numbered scales identify each of these positions with its related card column.

3. *Sensing unit connections.*—90 connections are provided for the card columns of the master card from which information is to be sensed. These form the center four rows of the plug board. Numbered scales identify each of these positions with its related card column.

4. *Field Selection connections.*—The field selection units A, B, and C represented by sub-sections of three horizontal rows of connection positions. They are disposed on the lower part of the board. Each vertical set of three represents one "Input" column of a Field Selection Unit. The upper two rows of field positions are the entry rows—wiring to these is from the sensing unit connections. The third row of selection positions are the exits from the Field Selection Unit.

5. A single sub-section of four horizontal rows form the output for Field Selection. Incidentally, the upper row of this section is also the exit for the C Field Selection Unit. Each vertical set of four positions represents one Output column for the Selection Units. This sub-section provides the means for Y-wiring the Field Selection Units to a single field of the detail card.

It is evident that the card column connections from the Sensing unit directly to the Punch or through the field selection units to the punch are made by the operator. It is clear that a wide variety of connections may be made to meet the application requirements of the particular job or problem. Examples of these will be detailed later.

A transfer switch is provided and functions in identically the same manner as that of standard punch when the punch is being operated manually from the keyboard. When the sensing mechanism takes over its automatic duplicating function, the transfer switch is disabled. Both upper and lower half card columns are sensed simultaneously and will be punched simultaneously if so connected.

A low card signal is provided for the card feeding magazine for the punch and when the cards reach a low point, a red signal lamp is lighted.

A no-card switch is provided so that if there is no card in the sensing unit, this switch is open and no duplicating action can take place.

Other features of the invention will be set forth in detail in the subsequent specification. The actual punch circuit employed is of the general type set forth in U. S. patents to William W. Lasker respectively No. 2,124,178, issued July 19, 1938, entitled "Statistical Card Punch" and No. 2,165,556, issued July 11, 1939, entitled "Accounting System and Machine." The particular form of record file employed with the sensing unit and controlled by the operator is set forth in an application to N. Y. Andersen, Serial Number 303,582, filed August 9, 1952, now Patent No. 2,729,531, entitled "Conveyor Type File."

It is of course possible that other types of files may be used so long as they contain master cards which may be inserted in the slot of the sensing unit to be gang sensed as above generally described.

A present preferred form which the invention may assume is illustrated in the drawings of which, Fig. 1 is a general view in perspective of the sensing and control unit and the punch controlled thereby;

Fig. 3 is an enlarged partial rear elevation of the punch showing the carriage and split commutator and associated micro-switch with the switch in closed position;

Fig. 4 is a detail view of part of the same mechanism showing the micro-switch in open position;

Fig. 5 is a vertical transverse section through the punch taken on the line 5—5 of Fig. 3;

Fig. 6 is an isometric view, broken away, showing the commutator used to connect the contacts in the sensing head, column by column with the punch pins, column by column;

Fig. 7 is a front elevation of the mechanism within the sensing control unit with the front cover removed;

Fig. 8 is a vertical front-to-rear section taken on the line 8—8 of Fig. 7;

Fig. 9 is a horizontal cross section taken on the line 9—9 of Fig. 7;

Fig. 10 is a horizontal cross section taken on the line 10—10 of Fig. 7;

Fig. 11 is a perspective view of the mechanism for ejecting a card from the sensing unit;

Fig. 12 is a vertical section taken on the line 12—12 of Fig. 7 and showing the drive motor and the control cams;

Fig. 13 is a horizontal section taken on the line 13—13 of Fig. 7 and showing the motor operated linkage for moving the gang sensing pins;

Fig. 14 is a horizontal section taken on the line 14—14 of Fig. 7 and showing the manner in which the control cams operate the power control switches;

Fig. 15 is an exploded isometric view showing how the contact springs in the sensing unit are mounted and insulated from each other;

Fig. 16 is a vertical cross section on the line 16—16 of Fig. 8 showing the method of mounting a contact spring;

Fig. 17 is a partial elevation of one of the sensing blocks;

Fig. 18 is a detail perspective view of the no-card switch on the sensing unit;

Figs. 19 to 26 inclusive are diagrammatic views showing examples of the flexibility of the connections possible between the sensing unit and punch;

Figs. 27 to 31 inclusive are diagrams of the operating circuits for the apparatus; and, Fig. 32 is a schematic diagram showing the circuit figures as they are related to show the entire circuit assembly.

Figure 1:
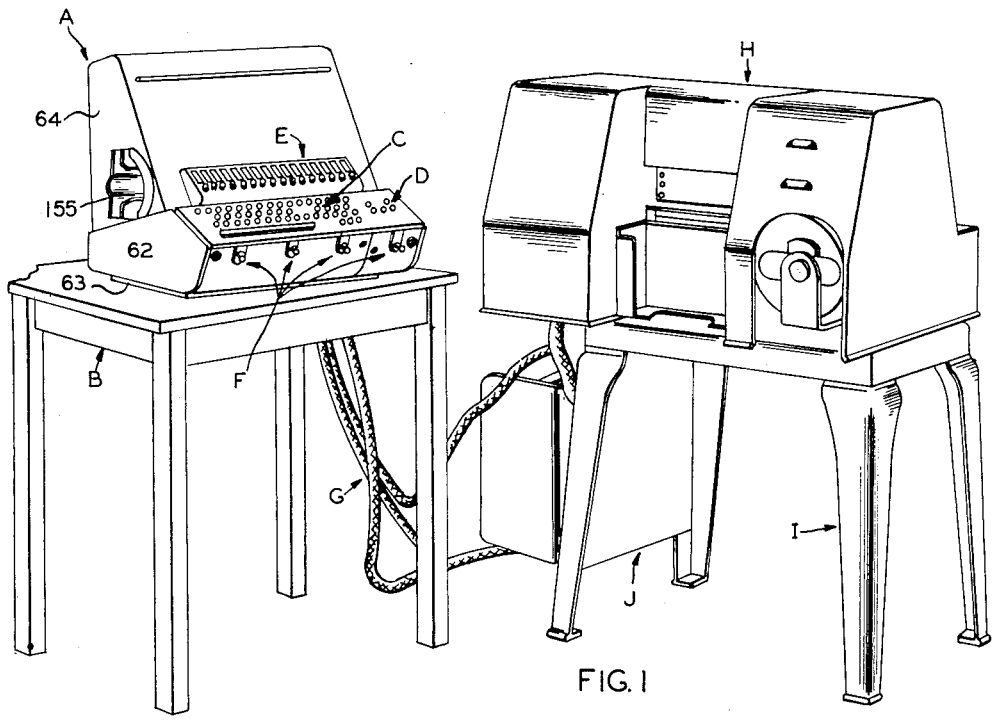

Referring now merely to the present preferred form of the invention shown in the accompanying drawings, it will be noted in Figure 1, which is a general view, that there is a sensing unit A mounted on a table B. This unit A is provided on its front face with a regular Alpha-Numeric keyboard C, a special series of control keys D, a series of Conve-File control keys E, and a series of circuit switches F all of which are shown and described more in detail hereinafter. This unit A is connected by suitable cables G to the punching unit H mounted on legs I, and to a plug board J, the operation and relative connections of which are later described in detail.

The operator sits in front of the sensing unit but the punching unit may be disposed at any suitable distance away from the sensing unit and is operated through the intermediary of the cables. Associated with the sensing unit and to one side of the unit is a regular well known Conve-File (not shown) containing a large number of master cards and the movement of this File to present a desired set of cards to the operator is achieved through the intermediary of the File control keys E in front of the operator on the front face of the unit A, and this operation is effected in the manner shown in the above mentioned application.

Punch carriage and commutator

Figure 2:
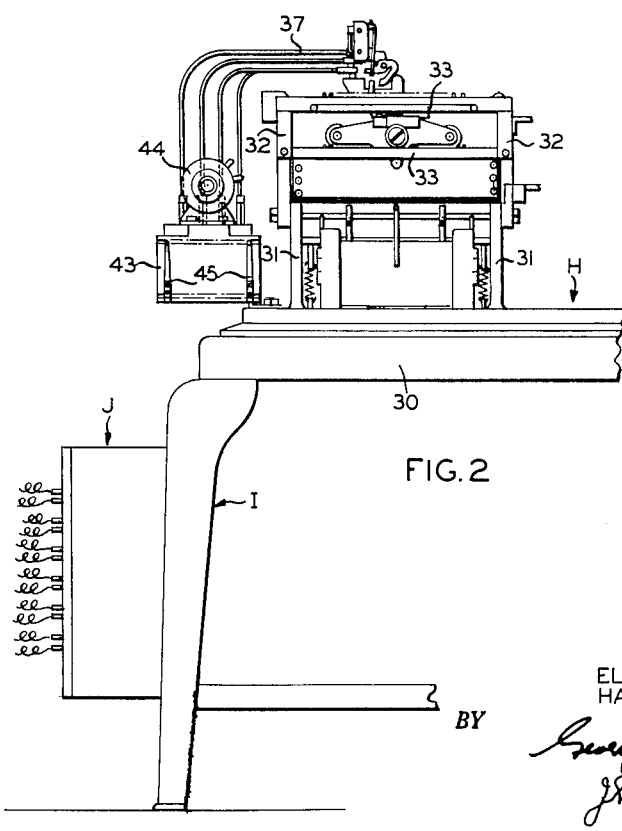
Fig. 2 is a partial rear elevation of the punch.
Figure 19:
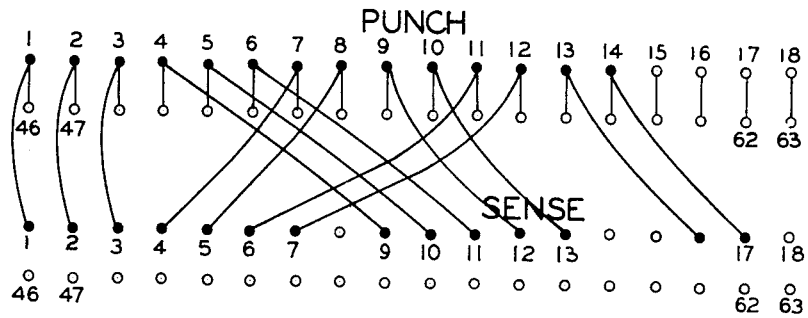
Figure 20:
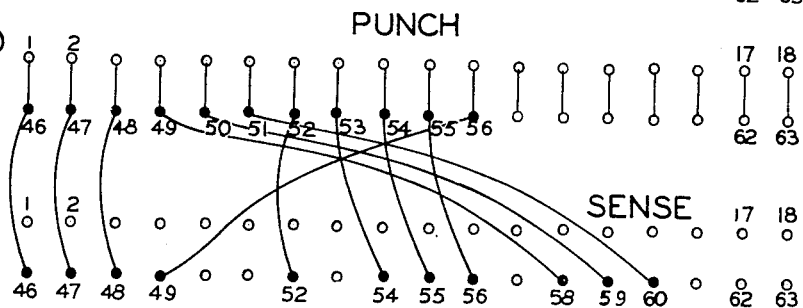
Figure 21:
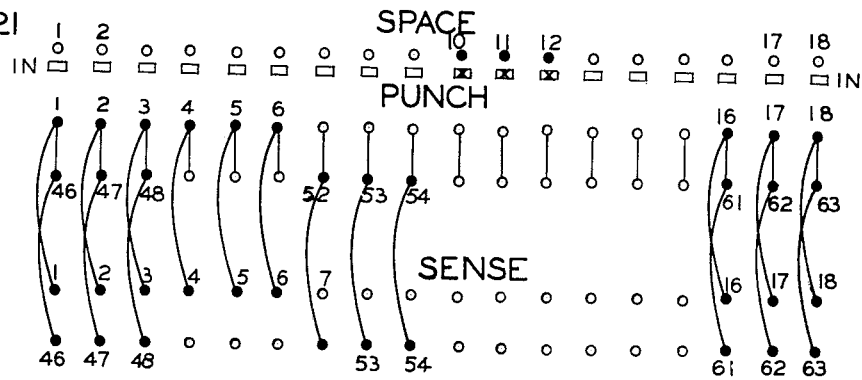
Figure 22:
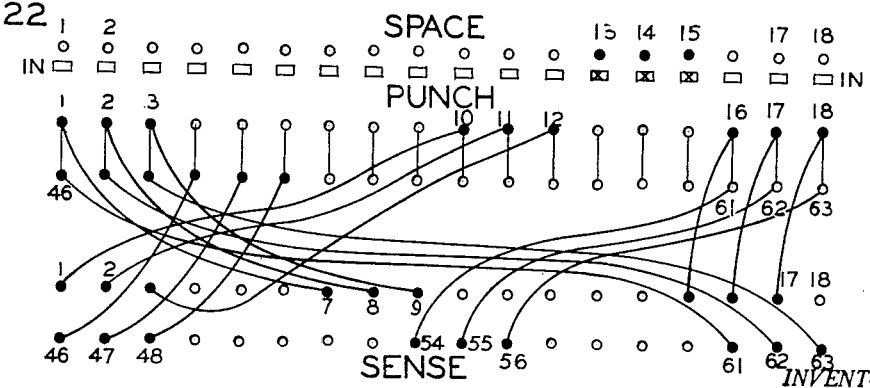
Figure 23:
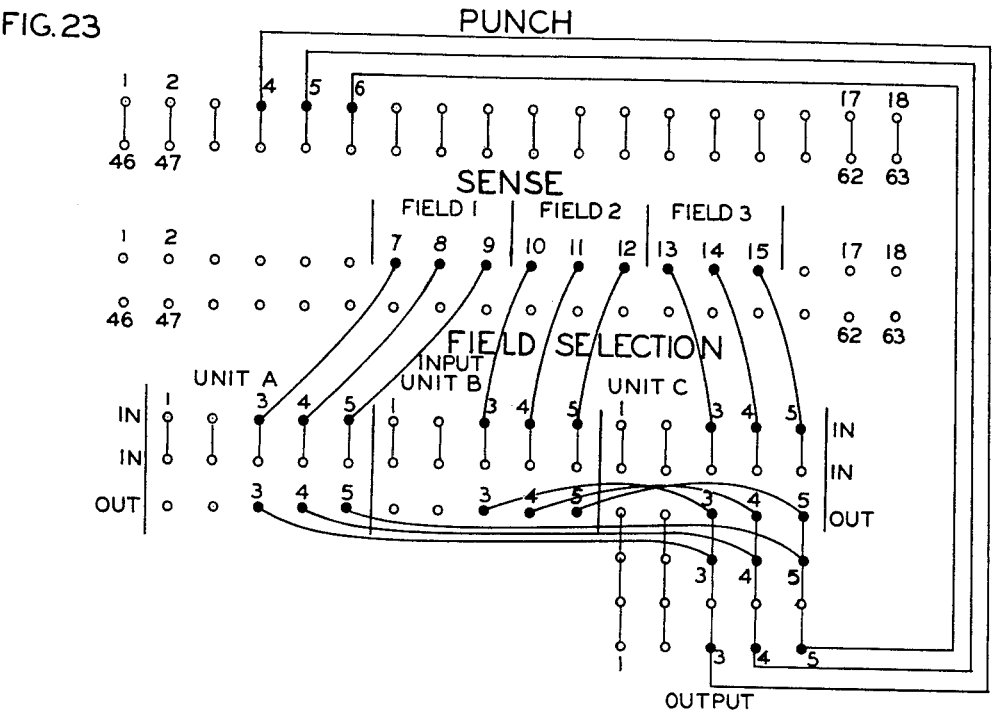
Figure 24:
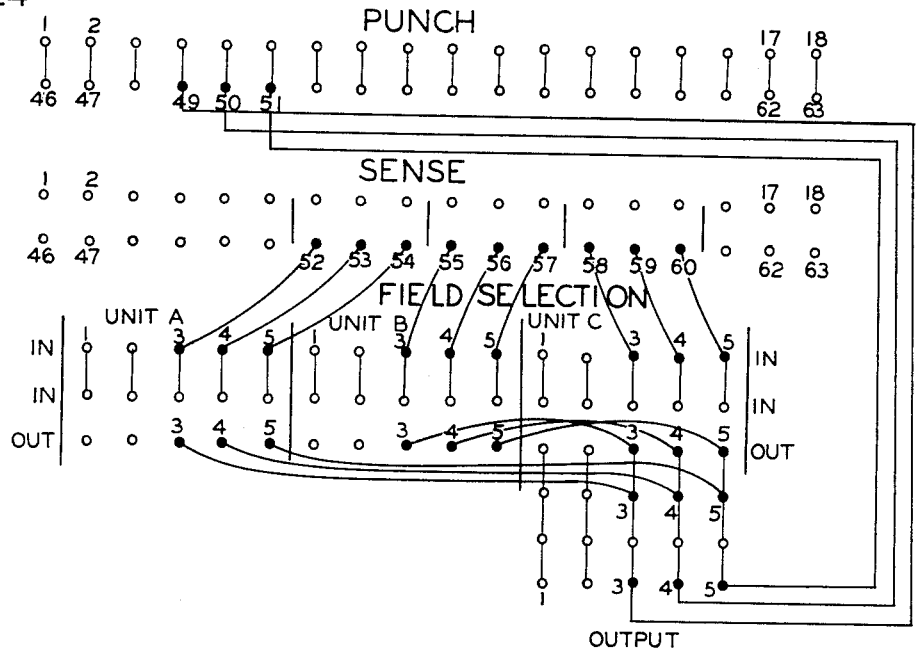
Figure 25:
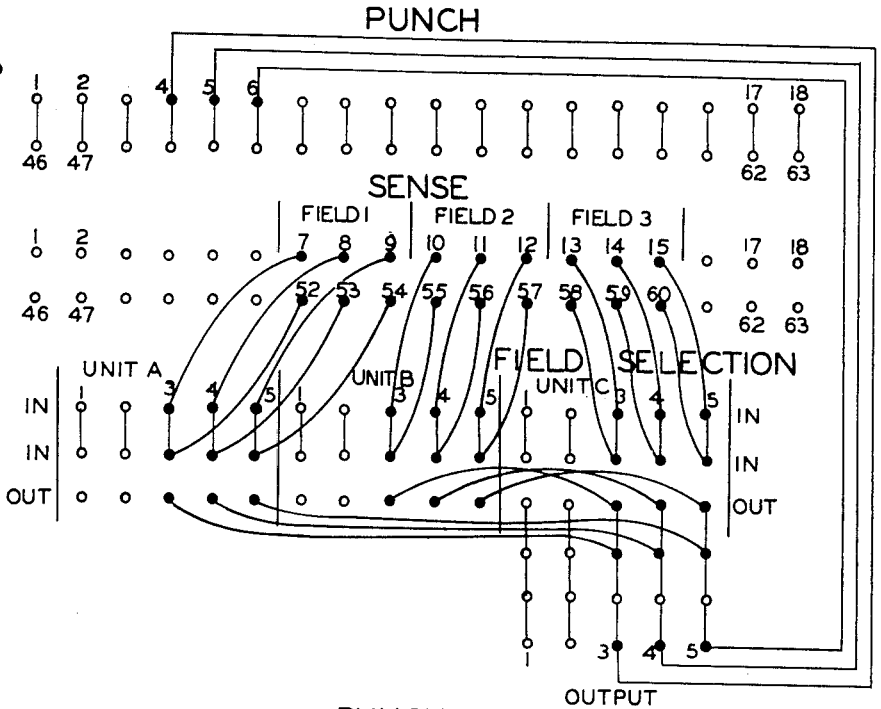
Figure 26:
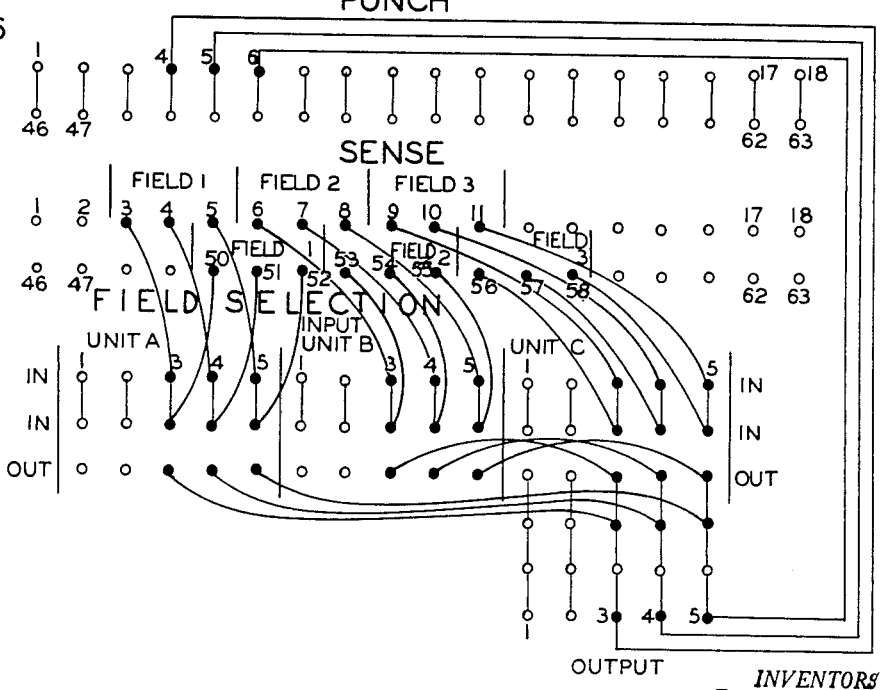

The punching unit, except in so far as later pointed out, is of the general type shown in the above mentioned Patent No. 2,124,178. It includes the table 30, upon which are disposed frame members 31, supporting other frame members 32, and cross bars 33. The lower cross bar 33 (Fig. 5) acts as a track on which bear rollers 34 and 35 connected to a carriage frame 36. In the usual manner this carriage frame supports apparatus including Bowden wires 37 operating levers 38 to depress elements 39 to set the usual punch set bars 40 which are disposed in a fixed frame below the actuating elements 39. There are twelve actuating elements 39 disposed across the line of travel of the carriage along the bank of set bars and there are twelve set bars in a column and forty-five columns of these set bars. The carriage is adapted to travel over the set bars column by column and is escaped step by step by means of a space bail 41 which may be operated by any of the levers 38 as well as by a special space ear 42 mounted on top of the space bail 41. After the carriage has passed over the entire forty-five columns of set bars and made the desired set-ups therein, a trip key or other element is operated to return the carriage and to trip the punch mechanism to punch the card all in a well known manner. The Bowden wire 37 are operated by a series of magnets disposed in a casing 43 at the side of the frame of the carriage (Fig. 2). A multi-plate rectifier 44 is disposed on top of the casing 43 and a transfer relay 45 is disposed at the side thereof. The operative relation of this relay and rectifier will be explained in connection with the circuit operation.

The upper cross bar 33 (Fig. 2) is a block of insulation 46 in which are embedded two rows of L-shaped contacts 47 the lower limbs 48 of which extend to the bottom face of the block and which are alternately extended in opposite lateral directions as shown for space saving purposes. There are forty-five contacts in each row and they are electrically separate as to the two rows and the adjacent contacts in each row. The upper ends 49 of these L-shaped contacts extend above the top of the block 46 and are apertured to provide means to connect circuit wires to each contact, as and for purposes to be later described.

Fastened to the outside of the block 46 is a metal bar 50 the lower edge of which is on a level with the lower faces of the contacts 47. An insulating plate or block 51 is fastened by screws to the side of the carriage plate 36 and supports, side by side, three brushes 52, 53, and 54 which make contact, respectively, with the bar 50 and the separate rows of contacts 47 as shown in Fig. 5. Thus the bar 50 and the rows of contacts are separately contacted by their respective brushes and the relations of the circuits including them will be later described.

Space-bail-operated micro-switch (Figs. 3, 4 and 5)

Fastened to one side of the top of the carriage by means of a bracket plate 55 is a casing of micro-switch 56 adapted to be actuated by the movement of a spring lever 57 pivoted at 57'. The normal tendency of this spring lever is to move to the right as in Fig. 4 and keep the switch open. Extending laterally from the spring lever 57 is a laterally notched plate 58 (Fig. 5) and projecting into this notch is one end of a bell crank 59 having a shoulder 60. This bell crank is pivoted at 61 to the side of a dependent bracket plate 62 fastened to the top of the carriage. The other end of the bell crank 59 is dependent into the path of the bail 41 so that when the carriage is spaced by the movement of the bail as in Fig. 4 it contacts the dependent end of the bell crank and tilts it to the position shown thus lowering the other end of the bell crank and removing the shoulder 60 from the lower end of the spring lever 57 so that the lever may move to the right and open the micro-switch. When the space bail moves back to the left, a spring 61' connected to the bell crank restores it to normal position. Since the plate 58 is riding upon the downwardly sloped upper edge of the forward end of the bell crank, this restoratory movement of the bell crank will cause the spring lever 57 to move to the left (as in Fig. 3) back of shoulder 60 and close the micro-switch. Thus every time the carriage is spaced the switch is opened to disconnect certain circuits. However, as soon as the carriage has been spaced these circuits are restored. This permits the restoration of the punch magnets to normal after each column is set-up in the punch and readies them for setting-up the next column.

Sensing pins and card guides (Figs. 1, 7, 8 and 9)

The sensing unit A is contained in a lower casing 62 resting on the table B and having a bottom plate 63, and an upper removable casing 64. On the front of the casing 62 is secured a key board in which are disposed the keys C and D previously mentioned, and the switches F. On the front of the upper casing 64 is secured a key board in which are disposed the keys E for the control of the Conve-File before mentioned. Mounted on the lower base plate 63 by means of bracket plates 65 and 66 is a sensing pin unit contained in a shallow U-shaped casting 67 with side plates 68. Fixed within a recess on the inner front face of the casting 67 are spaced apertured plates 69 and 70 separated by upper and lower spacing strips 71 and 72 to form a passage for a perforated card and to act as guides for the upper end lower edges thereof. There are 540 apertures in the plates 68 and 69 corresponding in number to the number of index positions on the usual Powers card.

Adjacent the plates 71 and 72 is another plate 73 also apertured in alignment with those in said plates and adapted to receive the reduced stems 74 of sensing pins 75 the shoulders of which bear against the adjacent face of the plate 73. The other ends of these pins are provided with insulation 76. The plate 73 has secured thereto four spaced bolts 77 having springs 78 disposed around the bolts 77 and between the plates 70 and 73 to act as a resilient spacer. The bolts pass through suitable apertures in the plates 69 and 70, the castings 67 and the strips 71 and 72 and are provided with heads 79 to be operated on in a manner later described to move the pins 75 to the right as shown in Fig. 8. The main portions of the pins 75 are guided through apertures in channel bars 80 which extend across between, and are suitably anchored to the side plates 68. When the sensing pins 75 are moved to the right as shown in Fig. 8 this movement is effected by the engagement of the plate 73 with the shoulders on the pins. When thus positioned the pins are moved so as not to extend through the card passage between plates 69 and 70 so that a card may be inserted. When thus positioned the insulated ends of these sensing pins engage certain contact springs 81 the ends of which lie in the path of the pins and move said contacts away from engagement with certain common conducting rods 82. The function and purpose of these contact springs and rods will later be set forth. These contact springs 81 tend to move the pins 75 to the left, as viewed in Fig. 8.

Pin operating mechanism (Figs. 7, 8, 9 and 13)

Coiled around each of the bolts 77 between their heads 79 and the frame 67 is a compression spring 83 (Fig. 8) tending to hold the head in contact with a rod 84 carried in arms 85 secured to a shaft 86.

Card slot—Sensing chamber

There are two of these rods (Fig. 7) spaced apart and parallel to each other and each operates to depress two bolt heads as shown. The shafts 86 are supported above the surface of the casting at spaced points in bearing brackets 87 mounted on the adjacent face of the casting 67. Corresponding ends of these shafts 86 carry levers 88 (Fig. 13) which extend toward each other with ends overlapping. One has a slot 89 therein through which passes a stud 90 fixed to the other. A spring 91 engages the stud 90 and tends to hold the levers in the position shown in Fig. 9, in which the sensing pins are held out of the card passage in the position shown in Fig. 8.

One of the levers 88 has thereon a plate 92 containing a pivot to which is loosely pinned the lower end of an arm 93 formed integrally with an oscillating plate 94. On this plate are spaced rollers 95 bearing against the surface of an eccentric cam 96 fixed to a cam shaft 97. This shaft is journalled in upper and lower frame plates 98 of a frame having side plates 99. This frame supports the motor for operating the shaft 97 and a series of cams thereon to be later explained. The planar oscillation of the plate 94 is guided by brackets 100. The lower frame plate 98 is cut away at 101 to permit the free movement of the arm 93 and its associated elements. The frame for the motor represented by the plates 98 and 99 is mounted on the top of the casting 67 by spacing blocks 102. Thus the rotation of shaft 97 by the motor as will be later explained causes the oscillation of the plate 94 and consequently the rocking of the levers 88, whereby the plate 73 moves the pins 75 back and forth with respect to the card passage.

No-card switch operation and construction (Figs. 7, 9 and 18)

Seen in Figs. 7, 9, and 18 is the no-card switch which is closed cyclically when there is a card in the passage but cannot be closed when there is no card therein. Since this switch is in the main circuit between the power and the sensing unit, the unit cannot become effective until there is a card in the sensing unit as will be clear from later circuit-operation description. On one of the shafts 86 is fixed a yoke member (Fig. 18) having an L-shaped arm 103 which on its outer end supports a switch block 104 having superposed switch blades 105 and 106 with respective connector lugs 107, and 108. The contacts of these blades are disposed in vertical alignment with each other and over the top of a depressible pin 109 slidably housed in a sleeve 110 housed in the wall of the casting 67. When the pin is depressed the lower end 111 extends into the card passage if there is no card therein but is stopped in its full movement when there is a card therein. It will be noted that when the shaft 86 is rotated in the direction of the arrow in Fig. 18, it will swing the switch block 104 clock-wise during which movement the lower switch blade 106 contacts the upper end of pin 109 to depress it. If there is no card in the card passage the pin will have an unobstructed movement. The relations of the blades, the rotation of the shaft 84 and the stroke of the pin will not permit the switch contacts to close, but if a card is in the passage, the full movement of the pin is obstructed and the contacts can close and thus energize the sensing cricuit.

Card reject mechanism (Figs. 7, 9 and 11)

After a card is inserted in the passage it is desired to eject it when it has served its purpose or when a wrong card has been inserted and it should be removed before any sensing of it takes place. This is done by means of an eject magnet 112, the circuit relation of which will be described later. This magnet is secured (Fig. 7) on a side plate 65 and, when energized, pulls a link 113, which rocks a bell crank 114 pivoted to the front face of the casting 67. One end of this bell-crank is connected to the link 113 and the other end to a link 115, which, in turn, is connected to a rock lever 116 pivoted to the face of the casting. A spring 117 connected at one end to the lever 116 and at the other end to the casting tends to hold the lever in the position shown in Fig. 7 whereas the magnet, when energized, tends to swing it in the opposite direction.

Slidable in a very shallow recess 118 in the face of the casting 67 is a card eject plate 119 having longitudinal spaced slots 120 therein. The plate is guided in its sliding movement by headed studs 121 projecting through said slots and mounted in the casting. In Fig. 7 the plate is shown in its right hand or normal position in which it is held by spring 117. In Fig. 11 the plate is shown in its operative position in which the card 154 has been partially moved out of the passage so that an operator can grasp its left end and remove it entirely. The right edge of the plate 119 is provided with a pair of dependent fingers 122 spaced apart and extending downwardly through slots 123 in the casting 67 and through slots 124 in the apertured plate 69. As seen particularly in Fig. 9 the lower ends of the fingers extend across the card passage and their rear edges bear against the adjacent ends of the slots 123 when they are in retracted position. When the cards are introduced into the passage their leading edges come to bear against the left edges of these fingers with their upper and lower edges guided by the spacer strips 71 and 72, thus accurately positioning the card and its index positions with respect to the apertures in the plates 69 and 70. A stud 125 on the plate 119 is connected by spring 126 with the rock arm 116. A stop-stud 127 is disposed on the plate 119 to be engaged by the end of the rock lever 116. It is clear that when the rock lever is moved by the magnet clock-wise, it will exert a pull on spring 126 to advance the plate 119 and the fingers 122 to eject the card but if for some reason the card sticks or the fingers offer more resistance, the resilience of the spring will permit the lever 116 to move although the plate may not. When the rock lever is returned to normal by the spring 117 its end abuts the stud 127 to positively restore the plate 119 to normal position shown in Fig. 7.

Sensing unit motor (Figs. 7, 10, 12 and 14)

The previously mentioned cam shaft 97 (Fig. 7) is turned by reason of a ratchet wheel 128 fixed thereon (Fig. 10), engaged by a pawl 129 pivoted to the end of arm 130 extending from an upright plate 131 fixed on rock shaft 132. An armature 133 is connected across between plate 131 and another parallel plate 134 fixed on shaft 132.

The armature plate 133 is attracted by the cores of spaced magnets 135 which are mounted on a side wall 99 of the motor frame. The motor circuit connections will be later set forth. A spring 136 connected between arm 130 and pawl 129 tends to hold the pawl in engagement with the teeth of the ratchet wheel 128. Another stronger spring 137 is connected between the end of arm 130 and wall 98 and moves the pawl forward when the magnets are deenergized. The forward movement of the armature 133 is limited by a limit plate 138 bolted to the wall 98 and having a bent over lip 139 lying in the path of an edge 140 of a hole formed in the plate 131. Thus it is clear that the magnets will draw back the pawl enough to pass over one tooth on the ratchet plate 128 and then, when the magnets are deenergized, the spring 137 will draw the pawl forward to turn the ratchet wheel 128 thus driving the wheel, its shaft 97, and five cam plates 1, 2, 3, 4, and 5 fixed on shaft 97. The operation of these cams will later be set forth in the description of the circuit operation but the construction of a representative one of them and its associated elements is shown in Fig. 14. This cam is the cam #3 which, at the beginning of a sensing operation, is in position with its controlled contacts closed to give power to the magnet motor above described. Cam 3 has a dwell 141 engaging a roller 142 on one end of a bell crank 143 pivoted to a shaft 144 extending between wall plates 98 of the frame of the motor unit.

The other end of the bell crank 143 contacts a control switch comprising spring leaves 145, 146 and 147 mounted in an insulation block 150 attached to a supporting plate 151 the ends of which are secured to the wall plate 98. Between the leaf 145 and leaf 146 is a block of insulation 148 and on adjacent surfaces of the ends of leaves 146 and 147 are contact points 149. When the bell crank rides on the dwell 141 of the cam 3 the leaf 145 is moved to the right advancing leaf 146 to the right to close the contacts 149 for the purpose hereinafter set forth. The other cams operate in the same general manner but their detail operation will be set forth in the description of the circuit operation. The bell cranks 143 are guided by means of comb plates 152, and 153.

*Sensing contact blocks (Figs. 8, 15, 16 and 17)*

In describing the sensing pin construction and operation with respect to Fig. 8, mention was made of contact springs 81 and common conducting rods 82 and the fact that the springs are normally held out of contact with their conducting rods by means of the sensing pins 75 in the manner described. These contact springs are mounted in groups of 270 on two blocks. One group is related to the index positions in the upper zone of the master card and the other is related to the index positions in the lower zone of the master card.

Before the proper key is depressed, these pins 75 are in the position shown in Figs. 8 and 9 and holding the contact springs 81 out of contact with their common conducting rods 82. However, when the mechanism is put into action to allow the plate 73 to be moved to the left, in Fig. 8, the springs 81 will force the pins to the left and they will either abut the blank surface of the card 154 or pass through any holes which they may encounter. When they abut a blank card surface the movement of the pin is limited and the spring 81 will not contact its common rod 82 but when the pin passes through a hole in the card, in sensing it, the spring 81 will contact its common rod and make a certain circuit later described.

Since each block represents a zone of the card, there will be 45 springs 81 in each horizontal row of springs and there will be six vertical rows of springs in each block thus making a total of two hundred and seventy springs. There is a common conducting rod 82 for each horizontal row of springs in each block as seen in Fig. 8 and therefore there are twelve such rods 82. The two contact blocks are supported one above the other within the side plates 68 of the casting 67. At the ends of each block are plates of insulating material 156, to which the ends of the conducting common rods 82 are suitably connected in sloping rows as seen in Fig. 8.

The lower block will be described with incidental reference to the upper block since they are identical in construction. Each block is provided with comb plates 157 at their front and rear faces and these at their ends are suitably fastened to the plates 156. There is also a supporting plate 158 and a bracing bar 159 extending across between and connected to the end plates 156. In each block the vertical rows of six contact springs form part of a unit which is shown in exploded form in Fig. 15. There will therefore be forty-five of these units in each block. These units are formed of three plates of insulation 160, 161, and 162, the plate 161 being in the middle of the three. This plate 161 supports on one side the six contact spring assemblies and on the other side a metal backing plate 161 which has a projecting terminal ear 163 for connection with circuit wires, and is riveted to the plate 161. The upper ends of the plates 160 and 162 have projecting ears 164 apertured to receive the uppermost conducting rod 82 thereby holding the plates in alignment. The lower edges of plates 160, 161 and 162 are cut away at 165 to permit easy access to the terminals 163 on each unit.

The relationship in assembly of the contact springs 81, the plate 161 and the metal backing plate 161 is shown in Fig. 16. From this it can be observed that the springs 81 form the top of an integral metal strip the bottom of which is bent at right angles to the top end 81 and is riveted to one face of the insulating supporting plate 161, by a rivet 167 which also connects a latch plate 168 to the spring 81 and acts to hold the spring in position by reason of a lip 169 which is bent over on the end of latch plate 168 and projects through aligned holes in the spring 81 and the insulating plate 161 and keeps the spring 81 from turning on its rivet 167. The latch plate 168 is resilient and to free the spring 81 it is merely necessary to lift the end of the latch plate until its lip clears the aligned holes and the spring may be turned on its support. The other end of the spring 81 which is also resilient is offset as at 170 to press against a bi-metallic rectifier button 171 which lies in a fitted hole 172 in the plate 161. This button is slipped under the end of the spring 81 into the hole 172 and is held therein by this end.

The metallic backing plate 161 is riveted to the insulating plate 161 at points such as 173. As seen in Fig. 16, it contacts the opposite side of the buttons 171 but does not contact otherwise with the spring 81. The circuit connections through these spring plates and the buttons will be described later.

Firty-five of these spring plate units and supports are disposed side by side to form the blocks as indicated in Fig. 17. They are held in place by means of the two comb plates 157 in the comb slots of which the adjacent edges of the insulating plates or supports 161 lie. The insulating spacer plates 160 and 162 are disposed as shown on opposite side of the plates 161 and 161 and their edges merely rest on the edges of the comb plates and float therebetween. The rear corner of four of the spacer plates such as 160 are projected rearwardly as at 174 and are slotted to receive the bracing bars 159 to provide additional means to brace these units together as a compact unit or block. As shown in Fig. 9 there are four of these spacer plates 160 which have these projections 174 and up between pairs of them extend supporting and bracing bars 175 which are connected to the back of the channel or comb plates 157 on the back of each block as shown in Figs. 8 and 9 and at their upper and lower ends are connected to the adjacent edges of the walls of the casting 67. It is to these bars 175 that the supporting brackets 66 are connected as shown in Figs. 8 and 9.

*Sensing circuit and operation*

This circuit and associated apparatus are illustrated on Figs. 27–31 inclusive, and are related as shown in Fig. 32.

It includes the following associated apparatus:

1. Master card sensing blocks.
2. Split commutator for all 90 columns with traveling brush on punch carriage and microswitch in series therewith, which is opened by the space bail of the punch to open the circuit to allow the numeric magnet to restore to normal.
3. Plug board wired to the commutator and the sensing blocks and associated with short leads which permit great selectivity in circuit connections to adapt the apparatus to various problems. The back of this board supports a large number of the relays involved. It also supports the carriage-space switches which are operated to automatically space the carriage over predetermined columns of the master card.
4. A starting motor of the magnetic-interrupter type which operates a series of power-controlling timing cams and mechanical means to raise and lower the sensing pins with respect to the master card.
5. A series of primary and secondary relays associated between the punch magnets, the sensing block contacts, and the transfer relay.

6. The standard punch panel board to which some of the wires are connected and from which the sensing circuit receives its power and to which the punch circuit is connected in the usual well-known manner.

7. A sensing control key board alongside the regular punch key board and including field selection keys, reject key and non-select key, as well as a "no card" and "lower zone lamps. The field selection keys and the non-select keys are latched when operated and unlatch any previously latched keys. The regular "trip" key of the punch also is associated with a relay to operate the motor to return it to normal starting position and one of the cams will cause the ejection of the card after the sensing pins have been moved out of the car slot.

8. Field selection relays operated by the respective control board keys. Only one field may be used at a time although all of them may be connected up through the plug board in advance.

9. Sensing unit terminal strip to make connections between control key board, and plug and panel board which are removed from each other.

10. "No card" contact which is open when no card is in the sensing unit and prevents operation of primary relays.

11. Empty magazine contacts which close when card supply gets too low and lights a red light for operator.

12. Transfer control relay which is energized whenever any numeric secondary relay is operated to open the transfer relay switch negative line to disable keys of the punch.

13. Eject solenoid to remove card from sensing unit as timed cams return sensing pins to normal starting position.

14. Power source which includes a step down transformer rectifier unit tied in to certain posts on the panel board.

Figure 30:
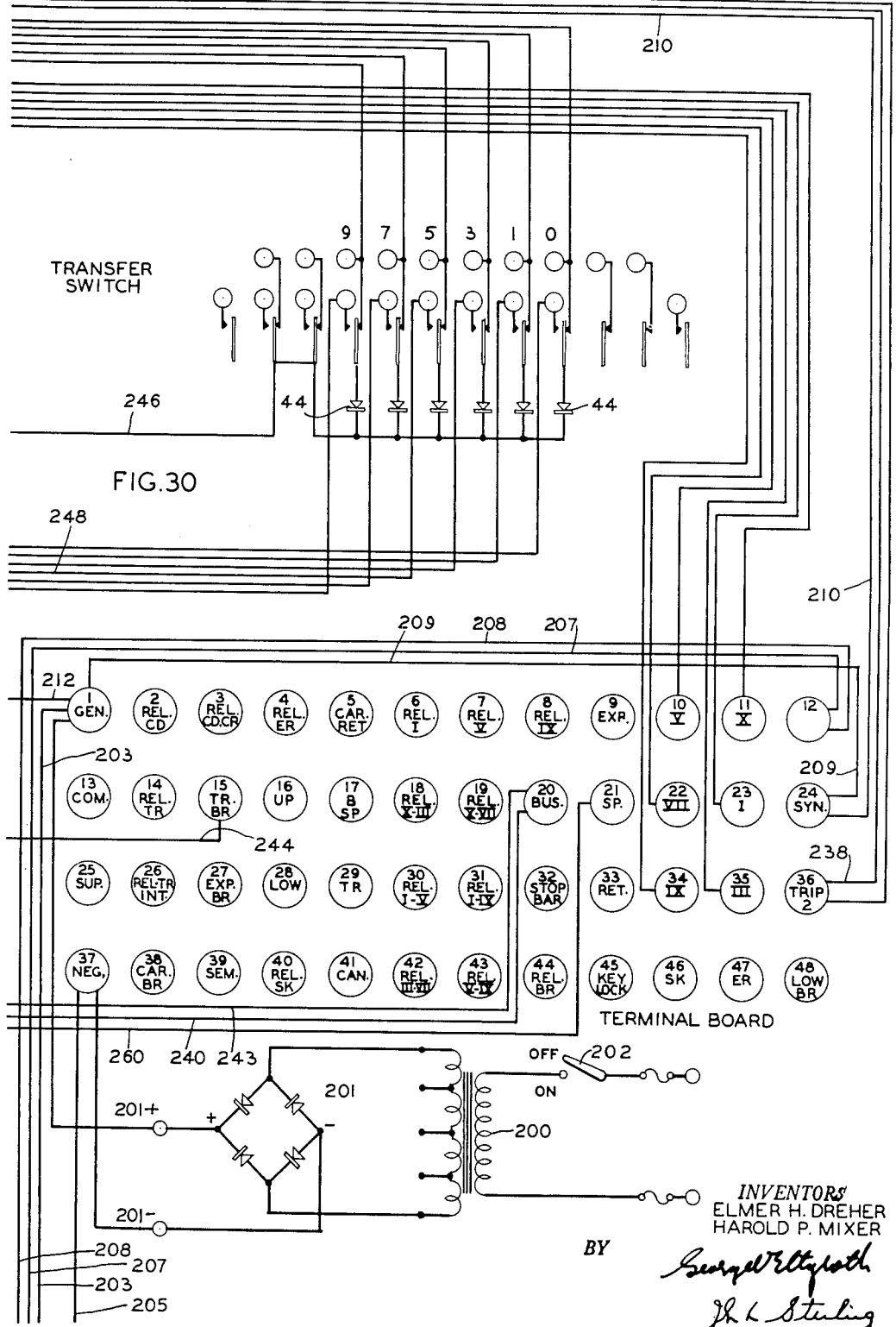

In Fig. 30 is shown the power source which taps current from the mains through a step-down transformer 200, and a selenium rectifier 201. This unit supplies direct current at various voltages which vary from about 20 to 27 volts. The rectifier is connected by wire 201+ on the positive side to a position "Gen" on the panel board and on the negative side by wire 201— to the position "Neg" on said board. An "On-Off" switch 202 disconnects the power from the mains when desired. Since this power is connected to the regular positions on the panel board it is available also to operate the punch in the usual manner, besides energizing the sensing unit circuit now being described.

Wire 203 extends from the "Gen" position on the panel board to the #4 position on the sensing unit terminal strip. Wire 205 extends from "Neg" position on the panel board to the #5 position on the terminal strip. From the #4 position on the terminal strip wire 206 leads through the sensing unit "On-Off" switch to the #8 position on the terminal strip and thence on wire 207 to #12 position on the panel board which is a mere tie-in point; thence over wire 208 to the common bar 50 of the commutator on the punch frame. From "Gen" position on the panel board, wire 209 extends to tie-in position "Syn" on panel board thence over wire 210 to the wire 211 common to contacts operated by all the primary relays. Another wire 212 extends from the "Gen" position on the panel board to a contact controlled by the "Lower" relay and to one of the "Empty magazine" contacts.

From the sensing unit "On-Off" switch by wire 206 a wire 213 extends to a contact of an "open senser" relay. Off wire 213 branches a wire 214 from which branch wires, such as 215, connect to contacts, such as 216 associated with the control keys "Rej," "A," "B," "C," and "O." When either of the keys "A," "B," "C," or "O" are actuated they connect wire 215 with another contact connected to wire 217 leading to wire 218 common to these keys, which leads through position 9 on terminal strip to a contact which is normally closed at the start of a sensing cycle, by a starting-motor control cam #3.

Also when either of the keys "A," "B," or "C," field selection keys are operated they close another contact connecting their branch wires 215 with another wire such as 219 as in the case where key "C" is depressed, which wire leads through #3 position on the terminal strip to the relay of field selection switch "C." Similar actions take place when keys "A" and "B" are operated to energize their respective field selection relays. It will be noted that the key "O" has no second contact to close because this is operated when no field selection is desired.

When the key "Rej" is operated it closes a contact to wire 220 leading via strip position #10 to a contact associated with motor-control cam #4 which contact is closed at the half cycle point before the "Rej" key is operated and starts the motor to return the parts to normal starting position. Associated with all these control keys is a spring-operated latch bar 221 having thereon pins 222 related to cam shoulders 223 on keys "A," "B," "C," and "O" and with a cam surface 224 on stem of key "Rej." When the keys "A," "B," "C," and "O" are operated they cam the bar 221 to the right and it springs right back to place the pins 222 over the shoulders on the stems of these keys to hold the keys depressed. It will be clear that when such a key is depressed it will, in moving the bar 221 to the right, also move the pins off the shoulders on other key stems and release these keys. Thus only one key of this kind can remain depressed at one time. In other words only one field selection may be made effective at a time. This releasing action is also true of the "Rej" key as is obvious.

These keys "A," "B," "C," and "O" may also be released when the bar 221 is moved by energization of a "key restoring" relay associated with a bell-crank 225 connected to the bar 221. One side of this relay's coil is connected to wire 226 connected to the #5 position on the sensing unit terminal strip which is connected by wire 205 to the "Neg" position on the panel board. The other side of this relay is connected by wire 227 leading to position #11 on the sensing unit terminal strip from which leads a wire 228 leading to a contact under the control of motor control cam #5 and which contact is closed when a card in the senser is to be ejected. When this relay is energized the bar 221 is moved to release any keys held down. From position #11 on the terminal strip a wire 229 leads to a "card-eject" solenoid the other side of which is connected by wire 230 to the #5 position on the terminal strip which is connected to "Neg" position on the panel board, over wire 205. This places the "card-eject" solenoid in parallel with the "key restoring" relay and they operate in unison when the eject contact operated by the motor cam #5 is closed.

*Senser motor circuits and operation*

When either keys "A," "B," "C," or "O" are depressed, as previously explained, current flows through the contacts of motor cam #3, which at the start are closed, along wire 231, common to the contacts of cams #1, #2, #3 *and* #4, thence along wire 232 through the coils of the motor, along wires 233 back to the #5 position on the terminal strip, which is connected to the "Neg" position on the panel board. This motor is a well-known type having self-interrupting solenoid coils which operate intermittently through switch 232 to oscillate a pawl and ratchet mechanism to drive a shaft 97 on which are located the cams #1, #2, #3, #4, and #5, and another cam to raise and lower the sensing pins, the operation of which will be described separately. When the key punch is in normal position all of the cam contacts are open, except those of cam #3. When a field selection key is operated on the auxiliary keyboard the key contacts make, and the starting motor circuit is complete as above described. Thus the ratchet feed of the cam shaft takes place and the cams on it are turned from the 0 to the 180 degree position during which time the pins in the sensing unit are lowered into association with the master card in the unit. At this half way point all the cam contacts except #4 are open. The closing of either the "Trip" or the "Rej" key will energize the motor through the contacts of #4 cam whereby the second half of the shaft cycle occurs to raise the sensing pins away from the master card. The circuit through the "Rej" key has been described above. The "Trip" key operation is effective through the contacts on the "Open senser" relay one of which connects over wire 213 to the positive #4 position on the terminal strip. The other contact of this relay connects to wire 234 which joins wire 220 and therefore connects to the contacts of cam #4.

The sequence of the operation of these five cams is as follows: (3–1)—(4–2–5). Their operative sequence is as follows:

1. #3 cam—starting cam for moving pins to card.
2. #1 cam—picks up from #3 and completes first half rotation.
3. #4 cam—starting cam for moving pins out of card.
4. #2 cam—picks up from #4 cam and completes this half rotation.
5. #5 cam—a fast making and breaking timing cam and contact. This cam controls the card ejection. It works during the #2 cam period. It must make when the pins are out of the card slot and must break before the #2 cam completes its cycle.

Reference may be had to wire 235 which is common to contacts of cams #1, #2, and #5. This wire connects to wire 236 leading to the #8 position on the terminal board and thence over wire 206 through "On-Off" switch, #4 position on therminal board to wire 203 and thence to the "Gen" position on the panel board. At the end of the cycle the #3 cam is back in normal and its contacts are closed awaiting the depression of one of the control keys to start the operation all over again.

*Sensing unit circuits*

Figure 27:
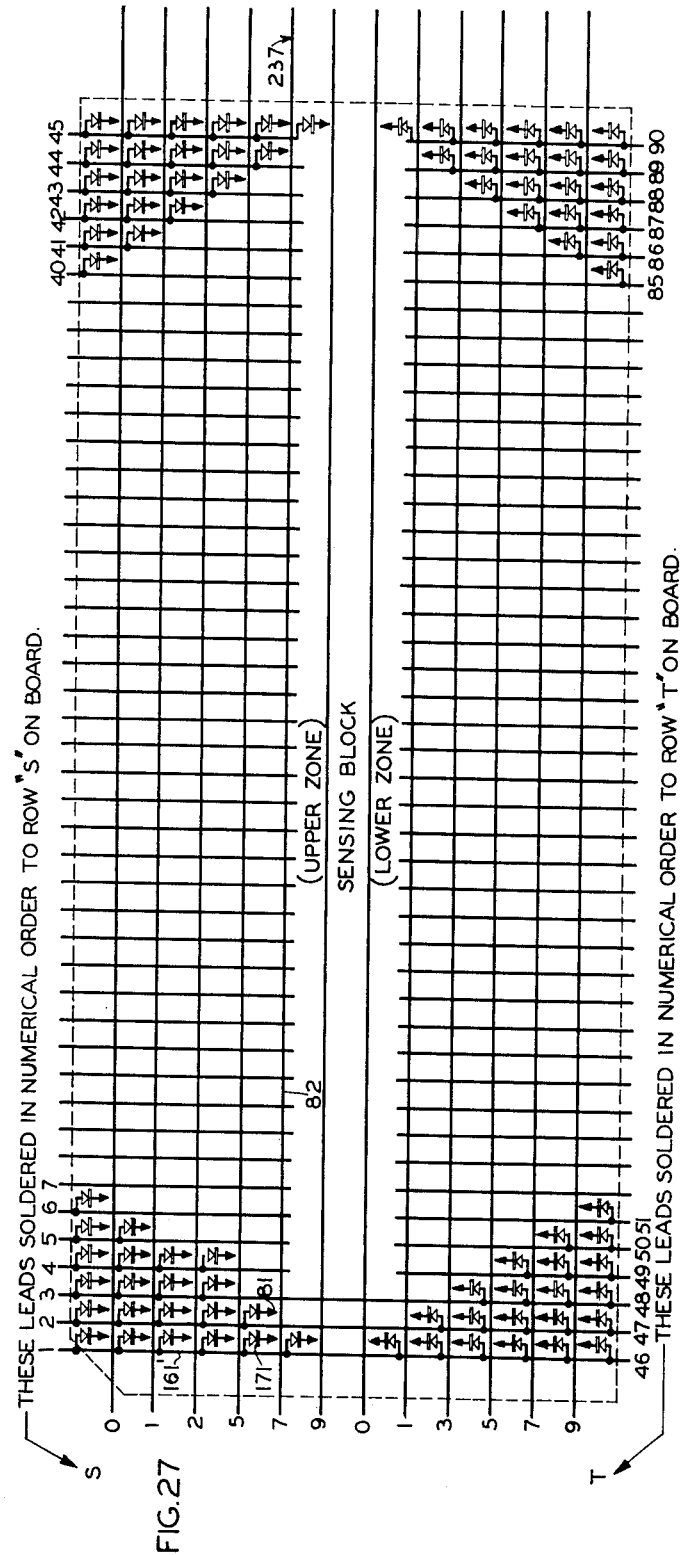

Diagrammatically shown in the drawings on Fig. 27 are the sensing blocks for sensing the upper and lower zones of a master card which may be placed therein. The mechanical structure of the unit has been described but diagrammatically it includes separate contacts for each of the 540 positions on the master card in the form of spring fingers 81 associated each with a selenium button 171 to prevent back flow of curent. There are six fingers in each column in each zone; there are 45 columns in each zone. The 0, 1, 3, 5, 7 and 9 contacts of each column in each zone are connected together by means of metal plate 161'. The forty-five columns of each zone are numbered. The upper and lower zone positions in each column are numbered. The columns in the block for the upper zone are numbered from 1 to 45 and those in the block for the lower zone are numbered from 46 to 90. The column positions for the upper and lower zones are respectively numbered 0, 1, 3, 5, 7 and 9 as shown. Extending across the face of each block are the common rods 82. Each rod covers the forty-five columns in its zone and there is a rod for each columnar position in each zone. Therefore when any finger 81 is allowed to move by its associated sensing pin 75 under control of the master card, it will contact its proper common rod 82. In other words there are twelve common rods as shown. Because it was desired to keep the drawings as simple as possible, only a few of the fingers are shown in the circuit diagrams. The contact fingers are numbered 81, the selenium buttons are numbered 171, and the common rods are numbered 82. Each of the common rods are connected by wires such as 237 (shown in connection with common rod for position #7 in the upper zone). This wire connects to winding of the #7 primary relay for the upper zone. The other side of this relay is connected to wire 238 common to all twelve numeric primary relays as well as the "space" primary relay. This wire 238 extends to the tie-in position "Trip-2" on the panel board and then over wire 239 to the "No-Card" contacts and thence over wire 240 to the position "Bus" on the panel board which is connected to the negative side of the line through the usual punch circuits. It is obvious that if the "No-Card" contacts are open then the primary relays cannot be energized and the numeric solenoids cannot be actuated to set up the punch.

As the primary relays are energized their contacts are closed and the current available on wire 211 will pass, to any one or more of a series of wires 241, and thence through the coils of the secondary relays and from each of these to wire 242 common to all the secondary relays, thence to wire 243 to the negative "Bus" on the panel board.

As any secondary relay is energized its contacts are closed. All the numeric secondary relays have three effective contacts and the secondary "space" relay has one effective contact. As an illustration the numeric secondary relay #9 will be considered. Its three contacts are, in order, #1, #2, #3 with respect to their nearness to the coil on the drawings. When contact #1 is closed it establishes a circuit as follows: From the positive "Trip-Break" position on the panel board over wire 244, which is common and leads to all of the first two contacts on these secondary relays, through the first contacts of relay 9 to a wire 245 which is common to all the numeric secondary relays, thence through the transfer control relay, over wire 243 to the "Bus" position on the panel board. The activation of this transfer control relay operates its armature and breaks the negative circuit to the transfer switch arms through wire 246. This action disables the punch keys when the sensing unit is operating. The transfer control relay armature, when shifted, also connected the third contact of the numeric secondary relays with the negative "Bus" position over common wire 247. These third contacts are connected respectively over wires 248 to the corresponding numeric position on the transfer relay for the upper and lower zone solenoids. The transfer switch, except for the connections shown on this circuit, is wired up to the punch in the regular manner and operates, in punching operations, as usual. It will be noted that the plates of the rectifier 44 are disposed between each armature of transfer switch 250 and the negative wire 246. This operation permits the sensing secondary relays to operate the numeric magnets through the transfer switch while at the same time preventing the operation of these magnets by the punch keys during duplicating operations.

The second contacts on the secondary relays are closed from current on common wire 244 over wires 251 to the proper numeric position on the panel. For example, when the second contact on the secondary relays 9 for both upper and lower zones is closed its wire 251 connects with the 9 position on the panel board and consequently the 9 solenoids are activated. The first and second contacts of the secondary relays are powered from the "Trip-Break" position on the panel board over wire 244 to place them under the control of the trip break finger on the punch commutator in a well known manner. This trip break finger contact with the commutator is normally always closed in the punch and receives positive power. This contact is only broken when the trip key is operated so that these relays cannot be activated again until after the trip operation is completed.

*Signal lamp circuits on control key board*

It has been shown how, from "Gen" position on the panel board wire 212 leads to the "empty magazine" contacts and to a contact controlled by the "lower" relay which takes the place of the usual semaphore relay used on the punch. When the feed magazine is within about twenty five cards of being empty, an arm attached to the card weight closes the contacts shown and makes the circuit from wire 212, over wire 252 to the #6 position on the sensing unit terminal strip, thence over wire 253 to a red lamp on the control board in front of the operator, thence over wire 254 to wire 226 previously mentioned which leads back to the "Neg" position on the panel board.

The relay nominated "Lower" relay on the circuit drawings takes the place of the usual semaphore construction in standard use on the punch and is activated in the well known manner when the transfer switch is in the lower field position. When thus activated it closes its contact making a circuit from wire 212 over wire 255 to #7 on the sensing unit terminal strip, thence over wire 256 to the green lamp on the control board to indicate the "lower" condition of the transfer switch, thence over wire 254 back to the negative.

*Split commutator*

As previously described this device comprises a common bar 50, and two separate rows of contacts 47, forty-five contacts in each row. Cooperating separately with each of these rows of contacts are brushes 53 and 54 which are mounted on and move with the traveling carriage of the punch H. As the carriage is stepped from column to column in the usual manner these brushes sweep over the respective contacts simultaneously in both rows. The rows of contacts and the common bar are fixed in position on the frame of the punch parallel and adjacent line of movement of the carriage. Also mounted and moving with the brushes 53 and 54 in sliding contact with the common bar 50 is a brush 52. Between the brushes (53 and 54) and brush 50 just mentioned and mounted on the carriage with them is a micro-switch 56 operated in the manner previously described, to open the circuit to allow the numeric solenoils to restore to normal and the carriage to space, through the movement of the usual space bail. However, provision is made, to be later described, whereby the space bail gets into movement during duplicating operations from the energization of the primary and secondary spacing relays whereby blank columns encountered in sensing the master card may be spaced over. As fast as the micro-switch makes and breaks and current passes through to the split commutator, the column circuit can be set up.

*Plug board*

This board, which has been generally described previously, is located on the punch frame below the usual panel board and is fastened to the machine legs I. On the back of this board are the primary and secondary relays and the field control switches. On the front of the board are the sockets for the plug board wiring connections and the blank column space switch board.

Figure 28:
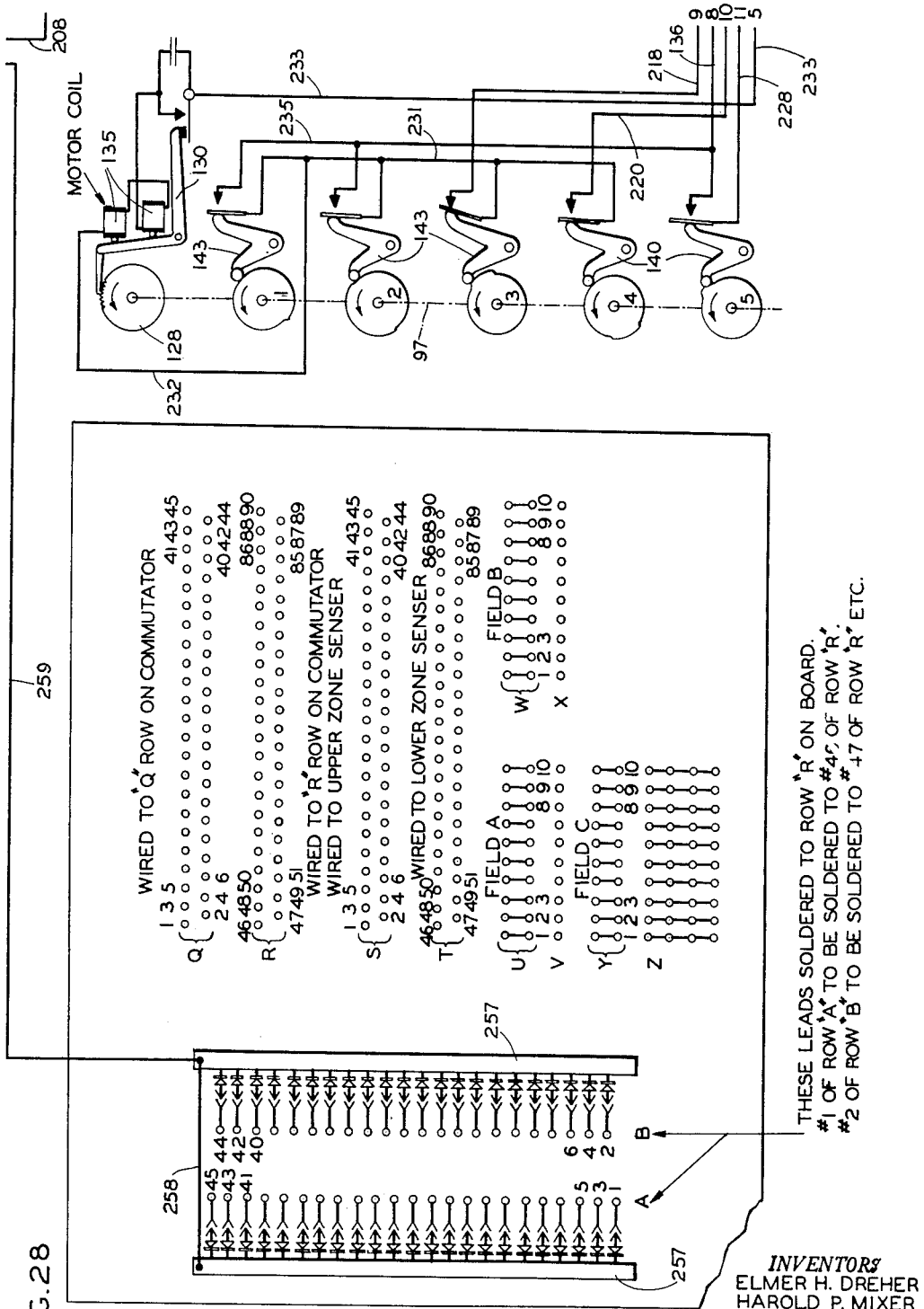
Figure 29:
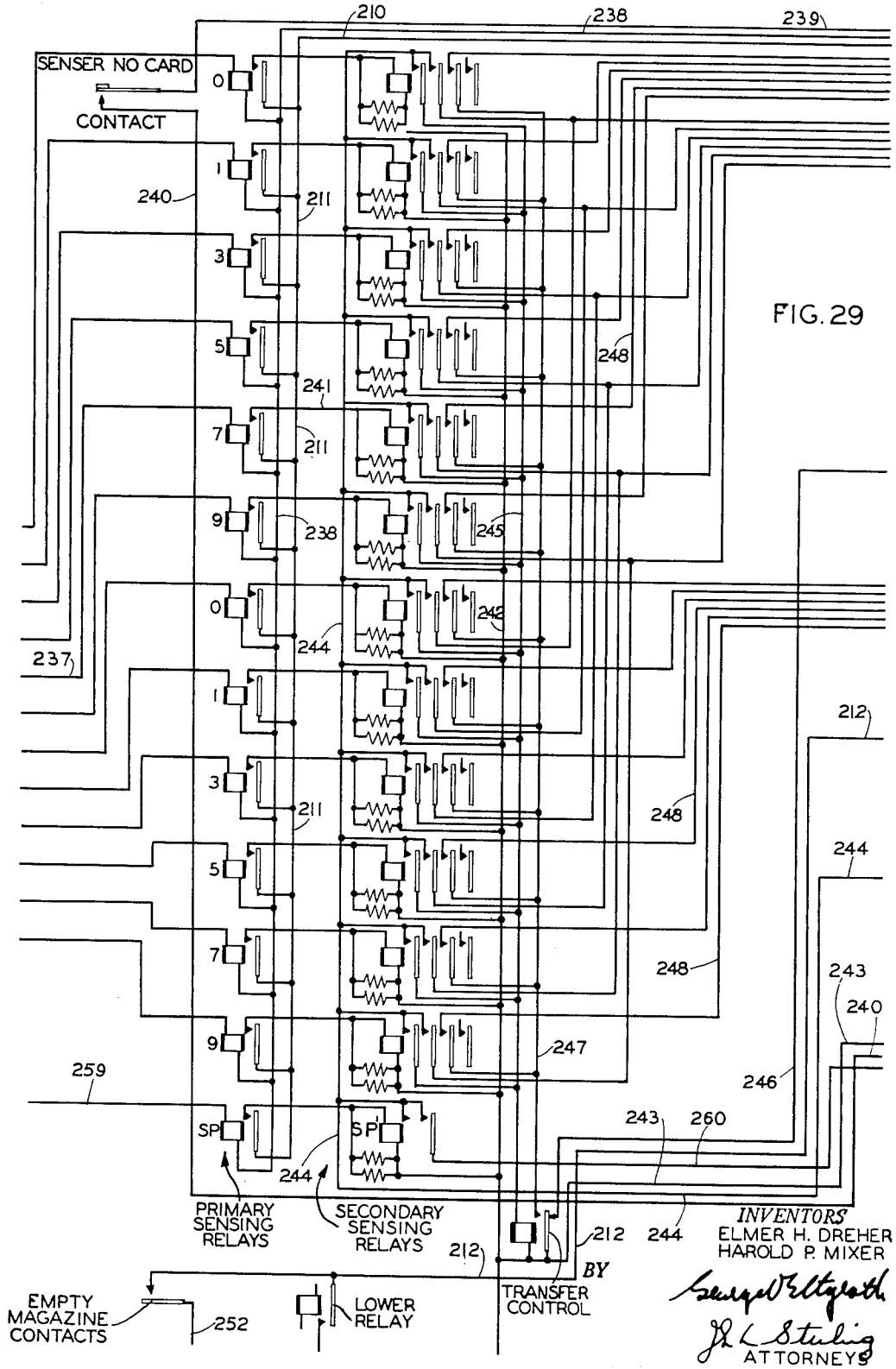

As shown in Fig. 28 a plurality of space switches are indicated at the left side of the board in two vertical rows numerated A and B and represent respectively the odd and even columns of the master card being sensed. One side of each row is connected to common bars 257 and the other sides are individually connected to forty-five lead wires which are soldered to the second row of holes i. e., row R on the plug board and in the order enumerated on the drawing. Between each switch and the common bars 257 are button rectifiers similar to the buttons 171 to prevent back flow. The bars 257 are connected by wire 258 and from these lead a wire 259 to the primary space relay SP which, when energized actuates the secondary space relay SP'. This latter relay in turn closes its one contact and connects wire 244 with wire 260 extending to the "Space" position SP on the panel board, whereupon the space magnet is operated. The secondary relay SP' in the space circuit has a stronger spring than the secondary numeric relays to insure that the space relay does not make before the numeric relays when there is information in a column.

*Q row of sockets on plug board.*—This row of forty-five sockets is soldered to the correspondingly numbered contacts on the Q row of the commutator.

*R row of sockets on the plug board.*—This row of forty-five sockets is soldered to the correspondingly numbered contacts on the R row of the commutator.

*S row of sockets on the plug board.*—This row of forty-five sockets is soldered to the S row of leads of the upper zone columns of the sensing unit contact blocks in numerical order.

*T row of sockets on the plug board.*—This row of forty-five sockets is soldered to the T row of leads of the lower zone columns of the sensing unit contact blocks in numerical order.

*Field selection switches and board sockets*

On the plug board, the field A sockets are in ten vertical rows and in two sections noted U and V. The two sockets in each vertical U row are wired together. They constitute the input for this field. The V rows are single adapted to be connected to the U row sockets by the activation of the field A switch (Fig. 31) which controls ten contacts as shown and closes them with the switch is energized. This lower row or V section constitutes the output for this field A.

On the board, the B selection field is arranged in the same manner and connected up the same way as field A and controlled by the field switch B which when closed connects section W with X. Similarly field C is operated and comprises sections Y and z controlled by field relays switch C. In this field, section Z has ten vertical rows with four sockets in each row wired together and the upper row constitutes the output for field C. The rest permit Y-wiring the field selection units to a single field of the detail card if desired.

It is noted that all the wiring from the sensing blocks to the plug board, from the commutator contacts to the plug board, and from the Q, R, S, and T rows on the plug board to the field selections sockets, has obviously not been shown because to do so would make the drawings practically unintelligible on account of the consequent maze of wiring. It is believed however that with the simple directions above given and the proper lettering of the drawings with appropriate numbers and symbols, the proper connections are clear. However, in order to make it clear how varied are the field selection connections which can be made to satisfy the many demands upon the operator a few examples of these connections Figs. 19–26 inclusive, will be given as follows:

*Control panel wiring.*—The wiring of the control panel is performed by the operator according to the duplicating requirements of individual applications. Connection wires with end plugs are provided to make the electrical connections from one position on the board to another.

Connections are made, either:

1. From the Sensing Unit Connection positions (rows S and T) of the master card for the card columns to be sensed, directly to the Punch connection positions (rows Q and R on the plug board) of the detail card for the card columns into which the information sensed is to be punched.

2. Where Field Selection is involved, the connections (rows S and T) from the sensing of the master card for the card columns of the different fields of Field Selection are wired to the entry for input of the individual columns of the Field Selection units (A, B or C). The output of these Field Selection Units are then wired to the Field Selection Output section; except in the case of Field Selection Unit C which is internally connected. From the Output section, the wiring is connected to the Punch Connections (rows Q and R on the plug board) of the detail card for the card columns into which the information from the field selected is to be punched.

*Example 1 (Fig. 19).*—Upper Half card columns to be sensed from the master card are wired to Upper Half detail card columns for punching.

As the Punch Carriage spaces from left to right across the detail card, the individual columns of the detail card sense and punch from the following columns of the master card:

Column 1 from Column 1.
Column 2 from Column 2.
Column 3 from Column 3.
Column 4 from Column 9.
Column 5 from Column 10.
Column 6 from Column 11.
Column 7 from Column 4.
Column 8 from Column 5.
Column 9 from Column 12.
Column 10 from Column 13.
Column 11 from Column 6.
Column 12 from Column 7.
Column 13 from Column 16.
Column 14 from Column 17.

Upper half detail card columns may sense and be punched from any Upper half master card columns. Both straight column-for-column duplication and transposed duplication are shown.

*Example 2 (Fig. 20)*.—Lower half card columns to be sensed from the master card are wired to lower half detail card columns for punching.

As the punch carriage spaces from left to right across the detail card, the individual columns of the detail card sense and punch from the following columns of the master card.

Column 46 from Column 46.
Column 47 from Column 47.
Column 48 from Column 48.
Column 49 from Column 58.
Column 50 from Column 59.
Column 51 from Column 60.
Column 52 from Column 52.
Column 53 from Column 54.
Column 54 from Column 55.
Column 55 from Column 56.
Column 56 from Column 49.

Lower half detail card columns may be sensed and punched from any Lower half card column. Both straight column-for-column duplication and transposed duplication are shown.

*Example 3 (Fig. 21)*.—Upper and Lower half card columns to be sensed from the master card are wired to Upper and Lower half detail card columns respectively for punching. As the Punch carriage spaces from left to right across the detail card, the individual columns of the detail card sense and punch from the following columns of the master card.

Columns 1 and 46 from Columns 1 and 46 respectively.
Columns 2 and 47 from Columns 2 and 47 respectively.
Columns 3 and 48 from Columns 3 and 48 respectively.
Column 4 from Column 4.
Column 5 from Column 5.
Column 6 from Column 6.
Column 52 from Column 52.
Column 53 from Column 53.
Column 54 from Column 54.
Columns 10 and 55 connected for automatic spacing.
Columns 11 and 56 connected for automatic spacing.
Columns 12 and 57 connected for automatic spacing.
Columns 13 and 58 unconnected for variable punching.
Columns 14 and 59 unconnected for variable punching.
Columns 15 and 60 unconnected for variable punching.
Columns 16 and 61 from Columns 16 and 61 respectively.
Columns 17 and 62 from Columns 17 and 62 respectively.
Columns 18 and 63 from Columns 18 and 63 respectively.

Straight column-for-column duplication is shown; from Upper and Lower half card columns simultaneously, from Upper half card columns only, from Lower half card columns only. Carriage space switches are shown set effective (In) for unconnected detail card columns. Blank columns are provided for variable punching.

*Example 4 (Fig. 22)*.—Upper and Lower half card columns to be sensed from the master card are wired to Upper and Lower half detail card columns respectively for punching.

As the carriage spaces from left to right across the detail card, the individual columns of the detail card are sensed from the following columns of the master card.

Columns 1 and 46 from Columns 7 and 61 respectively.
Columns 2 and 47 from Columns 8 and 62 respectively.
Columns 3 and 48 from Columns 9 and 63 respectively.
Column 49 from Column 46.
Column 50 from Column 47.
Column 51 from Column 48.
Columns 7 and 52 unconnected for variable punching.
Columns 8 and 53 unconnected for variable punching.
Columns 9 and 54 unconnected for variable punching.
Column 10 from Column 1.
Column 11 from Column 2.
Column 12 from Column 3.
Columns 13 and 58 connected for automatic spacing.
Columns 14 and 59 connected for automatic spacing.
Columns 15 and 60 connected for automatic spacing.
Columns 16 and 61 from Columns 15 and 54 respectively.
Columns 17 and 62 from Columns 16 and 55 respectively.
Columns 18 and 63 from Columns 17 and 56 respectively.

Transposed duplication is shown; from Upper and Lower half card columns simultaneously, from Upper half card columns only, from Lower half card columns only. Blank card columns are provided for variable punching. Carriage Space Connections are shown for unconnected detail card columns.

*Example 5 (Fig. 23)*.—Field selection of Upper half master card columns to punch into Upper half detail card columns.

The following connections are made from the master card columns to the Field Selection Unit Input columns:

Master card column 7 Field 1 to Unit A, column 3.
Master card column 8 Field 1 to Unit A, column 4.
Master card column 9 Field 1 to Unit A, column 5.
Master card column 10 Field 2 to Unit B, column 3.
Master card column 11 Field 2 to Unit B, column 4.
Master card column 12 Field 2 to Unit B, column 5.
Master card column 13 Field 3 to Unit C, column 3.
Master card column 14 Field 3 to Unit C, column 4.
Master card column 15 Field 3 to Unit C, column 5.

The following connections are made from the Field Selection Unit Input columns to the Field Selection Output columns:

Unit A, column 3 to Output column 3.
Unit A, column 4 to Output column 4.
Unit A, column 5, to Output column 5.
Unit B, column 3 to Ouput column 3.
Unit B, column 4 to Output column 4.
Unit B, column 5 to Output column 5.
Unit C, column 3 in Output column 3.
Unit C, column 4 in Output to column 4.
Unit C, column 5 in Output column 5.

The Field Selection Output columns are connected to the detail card columns as follows:

Output Column 3 to Detail Card Column 4.
Output Column 4 to Detail Card Column 5.
Output Column 5 to Detail Card Column 6.

As the Punch Carriage spaces through the columns of the detail card in which Field Selection information is to be punched, the field of the master card that will be sensed is predetermined by the operator having depressed the proper Field Selection Key after inserting the master card into the Sensing Unit. With the Field Selection Key A depressed, the detail card will sense and punch the following columns of the master card:

Column 4 from Column 7, Field 1.
Column 5 from Column 8, Field 1.
Column 6 from Column 9, Field 1.

With Key B depressed:
    Column 4 from Column 10, Field 2.
    Column 5 from Column 11, Field 2.
    Column 6 from Column 12, Field 2.

With Key C depressed:
    Column 4 from Column 13, Field 3.
    Column 5 from Column 14, Field 3.
    Column 6 from Column 15, Field 3.

*Example 6 (Fig. 24)*.—Field Selection of Lower half master card columns to punch into Upper half detail card columns. This example is alike in all respects to Example 5 except the Lower half of master and detail cards columns are connected.

*Example 7 (Fig. 25)*.—Field Selection of opposing Upper and Lower half card columns to punch into opposing Upper and Lower half detail card columns. Connections are made from opposing Upper and Lower half card columns to two contacts of each Field Selection Unit Input columns. The same connections are made from the Field Selection Unit Input columns to the Field Selection Output columns as in Example 5. The Field Selection Output columns are connected to the detail card columns as in Example 5. It is not necessary to wire to both the Upper half and Lower half detail card column contacts. The opposing contacts in the punch section are interconnected by the commutator brushes 53 and 54. When the Upper and Lower half master card columns are sensed, the related opposing Upper and Lower half master card columns will be punched.

*Example 8 (Fig. 26)*.—Field Selection of related Upper and Lower half columns master card to be punched into opposing Upper and Lower half detail card columns: This example is alike in all respects to Example 7 except the Upper and Lower half master card columns connected to each Field Selection Unit are not opposing columns.

*Conve-File and Entry Punch*.—While the Conve-File forms no part of the present invention, a few remarks about it may help the Examiner to understand the extreme utility of the entire combination of elements under the supervision and control of the operator. The Conve-File Control key board which is directly above the punch key board contain the following control keys:

*Thirteen Locating Keys*.—The Conve-File is divided into thirteen sections. A depression of a Locating Key causes the related section to automatically move into position convenient to the hand of the operator.

*A Stop Key*.—Should the operator depress an undesired Locating key, a depression of the Stop Key will stop the movement of the Conve-File. A new selection can then be made by depressing the proper Locating Key.

*A Left Travel Key*.—Free movement of the Conve-File to the left is obtained by depressing the Left Travel Key for as long as that movement is desired. When the key is released, the movement stops.

*A Right Travel Key*.—Free movement of the Conve-File to the right is obtained by depressing the Right Travel Key for as long as that movement is desired. When the key is released, the movement stops.

General operation

To prepare the Entry Punch for operation, it is first essential that the Plug Board be wired to perform the desired duplicating operation. This means that the connecting cords and switches available to the operator must be used to connect the desired columns of the Q and R rows on the board with the middle S and T rows. If field selection is employed then, these cords are connected from the Q and R rows, to the desired positions in the A, B and C fields on the Board and the outputs of these fields are connected to the proper columns on the S and T rows as illustrated in the above examples.

As to the Punch itself, many well known settings may be made such as Margin Stop, Intermediate stop, Skip Stops, column retract latches, and Marginal-Intermediate switch. The key board On-Off switch is set at "On." It is not essential that the entry punch operation start at column 1. The automatic duplicating will occur when the carriage is at a column of the detail card wired to the sensing unit, and then only if the related column of the master card is punched or, if not punched, is set for automatic spacing. The marginal stop may therefore be used to retain the repeat information, such as date, to be punched into the detail cards. The retract latches may be used to retain repeat information in their usual manner. This information may be "written through" manually from the keyboard. It may not, however, be written through automatically from the sensing unit, as this unit does not actuate the erase mechanism of the punch. If the punch is connected for automatic spacing in a field where the retract latches are set "Down," it must be remembered that this automatic spacing feature operates the "Space' magnet and no erase action occurs during this spacing.

With the Power switch and Sensing unit On-Off switch set "On," the operator presses the desired card file control button on the sensing unit to make available the desired master card which she then inserts into the entry slot in the sensing unit. If field selection is to be used, the proper field selection key A, B, or C is depressed. If field selection is not to be used, the non-select key O is depressed.

Whether the automatic duplicating operation will start immediately or not depends on the application. If the first information is to be variable, the initial column of the detail card and all desired following columns are not connected to the sensing unit. This set up is made by the operator manually by the keyboard. As soon as the carriage spaces into a column connected to the sensing unit, the automatic duplicating operation starts.

If the first information is to be automatically duplicated, the initial column of the remote detail card and all desired following columns are connected to the sensing unit. As long as the columns of the master card, connected to these detail card columns, contain perforations or are set for automatic spacing, the automatic duplicating operation will continue until the carriage spaces into an unconnected column or a column connected to a blank master card column. Key board operation can take over at this point to continue as long as this condition prevails. It is by this time clear that punch operation can be changed from automatic to manual or the reverse at any point across the surface of the card according to the character of the job to be done and the wiring of the plug board. The sensing unit can be disconnected at any time during the operation regardless of the wiring of the plug board by either of two means as above set forth, 1. Depressing the Reject Key.
2. Turning the sensing unit On-Off switch to Off position.

The keyboard may then be manipulated at will; no information will be sensed from the master card including that from field selection units. When all the desired information has been set up for one detail card, the carriage will be at an unconnected card column ready for a punch tripping operation. If the carriage is at the extreme right position beyond column 45 and 90, it is in what is equivalent to an unconnected card column.

The following are the tripping possibilities:

1. *Trip Key*.—Trips the punch, the carriage returns to the marginal stop, the master card is ejected from the sensing unit, all field selection units are rendered inactive.

The master card can, of course, be reinserted into the sensing unit by the operator as many times as desired.

2. *Intermediate trip key.*—Trips the punch, the carriage returns to an unconnected card column, a new field selection setting or the non-select setting can be made for the next card. As the carriage moves to the right for the next set up, new variable information can be inserted in unconnected columns; a new field may be selected from the field selections units; the same information will be automatically duplicated in connected columns. When all desired detail cards have been obtained from one master card, that card is released from the sensing unit by depressing the trip key at the time the last card is to be punched.

3. *Card Key.*—Trips the punch, the carriage remains stationary, the master card is held in the sensing unit, the original field selection or the non-select setting remains active. The card key is held depressed to produce as many identically punched cards as desired. The last card is punched and the master card is released by depressing the trip key.

4. *Card Carriage Return Key.*—Trips the punch, the set up remains in the punching dies, the transfer is to lower, the master card is held in the sensing unit, the original field selection unit or the non-select setting remains active. Additional variable information for the second detail card may be added to that contained in the first card or the original variable information may be changed. The same information will be automatically duplicated in connected columns. The last card is punched and the master card released by depressing the trip key.

5. *Single—Repeat Switch.*—When this switch is turned to repeat, the punch is tripped for as many cards as desired. When the switch is turned to single, the carriage returns to the marginal or intermediate stop depending on the setting of the marginal-intermediate switch, the master card is held in the sensing unit, the original field selection unit or the non-select setting remains active. If the carriage returns to a blank card column, a new field selection setting or the non-select setting can be made for the next card. As the carriage moves to the right for the next set-up, new variable information can be inserted in blank columns; a new field may be selected from the field selection units; the same information will be automatically duplicated in active fields. Again the repeat-punching operation can be performed. The trip key or the Reject Key must be depressed, however, when it is desired to release the master card from the sensing unit.

While we have described what we consider to be a highly desirable embodiment of our invention, it is obvious that many changes in form could be made without departing from the spirit of the invention, and we, therefore, do not limit ourselves to the exact form herein shown and described, nor to anything less than the whole of our invention as hereinbefore set forth, and as hereinafter claimed.

What we claim as new, and desire to secure by Letters Patent, is:

1. In a machine for gang sensing a master card and punching information therefrom into a detail card, the combination of a master-card-gang sensing unit in one location, a detail card punching unit in a remote location but electrically connected thereto, a punch keyboard at the sensing unit and connected to the punching unit for regular punching operations, a sensing control keyboard at the sensing unit and connected to the sensing unit and the punching unit to selectively make effective, for punching, the sensing of predetermined columns of the master card, and switching means at the punching unit preset by the operator to determine which columns of the detail card are to be punched.

2. In a machine for gang sensing a master card and punching information therefrom into a detail card, the combination of a master-card-gang sensing unit in one location, a detail card punching unit in a remote location but electrically connected thereto, a punch keyboard at the sensing unit and connected to the punching unit for regular punching operations, a sensing control keyboard at the sensing unit and connected to the sensing unit and the punching unit to selectively make effective, for punching, the sensing of predetermined columns of the master card, and means including switching means at the punching unit, preset by the operator, to enter the sensed information from the master card into the punching unit column by column.

3. In a machine for gang sensing a master card and punching information therefrom into a detail card, the combination of a master-card-gang sensing unit in one location, a detail card punching unit in a remote location but electrically connected thereto, a punch keyboard and a sensing control keyboard at the sensing unit, the punch keyboard adapted for regular punching operations independent of the sensing unit and connected to the punching unit, the sensing control keyboard connected to the sensing unit and the punching unit to selectively make effective, for punching, the sensing of predetermined columns of the master card, and switching means at the punching unit, and preset by the operator, to selectively connect columns in the sensing unit with columnar set bars in the punching unit.

4. In a machine for gang sensing a master card and punching information therefrom into a detail card, the combination of a master-card-gang sensing unit in one location, a detail card punching unit in a remote location but electrically connected thereto, means under the control of the operator at the sensing unit to initiate the gang-sensing of the master card, means selected and made effective by the operator to transmit sensed information from certain columnar areas of the master card and enter this information in non-corresponding columnar areas of the punch unit column by column, a punch keyboard at the sensing unit and means selected and made effective by operation of said keyboard to punch information into desired columns of the detail card independent of the information punched in said columns on the master card.

5. In a machine for gang sensing a master card and punching information therefrom into a detail card, the combination of a master-card-gang sensing unit in one location, a detail card punching unit in a remote location but electrically connected thereto, a punch keyboard and a sensing control keyboard at the sensing unit, the punch keyboard adapted to regular punching operations independent of the sensing unit and connected to the punching unit, the sensing control keyboard connected to the sensing unit and the punching unit to selectively make effective, for punching, the sensing of predetermined columns of the master card, and switching means at the punching unit, and preset by the operator, to selectively connect columns in the sensing unit with columnar set bars in the punching unit, said switching means including means to space over predetermined columns of the master card independent of the information therein.

6. In a machine for gang sensing a master card and punching information therefrom into a detail card, a sensing unit in one location, a punching unit in a remote location, a plug board on the punching unit, a punch keyboard and a sensing control keyboard at the sensing unit, the sensing control keyboard connected between the sensing unit and the plug board, a commutator on the frame of the punching unit, a circuit contact means in the sensing unit for each position on the master card, means for closing said contacts when a hole is found in that position of the master card, said contacts by columns joined to a series of connections on said plug board, said commutator having a series of contacts according to the number of columns on the detail card, said commutator contacts joined to another series of connections on the plug board, and connector elements available to the operator to join connections in one series with connections in the other series.

7. In a machine for gang sensing a master card and punching information therefrom into a detail card, a sensing unit, a punching unit, a plug board on the punching unit, a commutator on the frame of the punching unit, a circuit contact means in the sensing unit for each position of the master card, means for closing said contacts when a hole is found in that position of the master card, said contacts by columns joined to a series of connections on said plug board, said commutator having a series of contacts according to the number of columns on the detail card, said commutator contacts joined to another series of connections on the plug board, connector elements available to the operator to join connections in one series with connections in the other series, a spacing relay, and a series of switches, operator manipulable, on the plug board connected in order to the second series of connections and in parallel with the sensing contacts, and adapted, when closed to establish a circuit to said spacing relay.

8. In a machine for gang sensing a master card and punching information therefrom into a detail card, a punching unit including a travelling carriage, a series of commutator contacts and a common commutator bar fixed on the frame of the punching unit, a circuit containing brush means between the series of contacts and the bar, a switch in said circuit, said brush means and said switch mounted on the carriage, a space bail on the carriage adapted to be operated when the carriage is to be spaced, said bail cooperatively related to said switch to open the same when the bail is operated.

9. In a machine for gang sensing a master card and punching information therefrom into a detail card, a punching unit including a travelling carriage, a series of commutator contacts and a common commutator bar fixed on the frame of the punching unit, a brush associated with the common bar, a brush associated with said commutator contacts, a connection between said brushes, a switch in said connection, said brushes and switch mounted on said carriage, a space bail on the carriage adapted to be operated when the carriage is spaced, said bail cooperatively related to said switch to open the same when the bail is operated, a sensing unit for the master card and means operated when a hole therein is sensed to operate the proper magnet in the punching unit, said magnet being in circuit with said commutator, said circuit being thereby opened to restore the magnet to normal as the carriage spaces to the next position.

10. In a machine for gang sensing a master card and punching information therefrom into a detail card, a sensing unit comprising a chamber to receive a master card to be sensed, a plurality of pins to sense the positions of the card, a plurality of circuit contacts, one for each pin and adapted to be closed when a pin encounters a hole in the card, a starting motor in the unit, means operated by the motor and associated with the pins to move said pins to and from the card being sensed, a source of power connected to the motor, a series of cams operated by the motor and controlling switches which apply power to the motor, a control key board on the unit, an operator controlled key to start the motor and move the pins into engagement with the card and then stop, and other keys under the operator's control to energize the motor to return the pins to normal out of the card receiving chamber.

11. In a machine for gang sensing a master card and punching information therefrom into a detail card, a sensing unit comprising a chamber to receive a master card to be sensed, a plurality of pins to sense the positions of the card, a plurality of circuit contacts, one for each pin and adapted to be closed when a pin encounters a hole in the card, a starting motor to move the pins to and from the card, a control keyboard on the unit, key-operated means to start the motor and move the pins into engagement with the card and then stop, and other key-operated means to restart the motor to complete its cycle and return the pins to normal disengaged position.

12. In a machine for gang sensing a master card and punching information therefrom into a detail card, a sensing unit comprising a chamber to receive a master card to be sensed, a plurality of pins to sense the positions of the card, a plurality of circuit contacts, one for each pin and adapted to be closed when a pin encounters a hole in the card, a starting motor, a motor shaft, cams on said shaft, circuit switches controlled by said cams to control the application of power to said motor, key operated means to start the motor and move the pins into engagement with the card and stop, key operated means to restart the motor to return the pins to normal disengaged position and then stop, and means on the shaft to move the pins to and from the card.

13. In a machine for gang sensing a master card and punching information therefrom into a detail card, a plurality of pins to sense all the positions on the card, a plate supporting said pins, a starting motor, a shaft moved by said motor, cam means on the shaft and connected to said plate to move the pins to and from the card, cams on said shaft controlling switches in the power circuit to said motor, said last mentioned cams adapted to keep the circuit closed, after the motor is started, for a half rotation of the shaft, a key operated to start the motor for this half cycle movement and another key to restart the motor for the return cycle to restore the pins to normal disengaged position.

14. In a machine for gang sensing a master card and punching information therefrom into a detail card, a sensing unit for the master card comprising a chamber to receive the card to be sensed, a plurality of pins to be moved into engagement with all the positions on the card, a plate supporting said pins, a key-operated motor means to move said plate to advance the pins to the card and automatically stop and manually operated means to cause the motor to return the plate and the pins to normal position out of engagement with the cards.

15. In a machine for gang sensing a master card and punching information therefrom into a detail card, a sensing unit for the master card comprising a chamber to receive the card to be sensed, a plurality of pins to be moved into engagement with all the positions of the card, a plate supporting said pins, a key-operated motor means to move said plate to advance the pins to the card and stop and to at will return the plates and the pins to normal position out of engagement with the cards, a series of rows of spring contact fingers corresponding to the horizontal rows of positions on the card, each finger normally supported in a predetermined position by one of said pins when in normal position, and a series of common contact bars extending across adjacent the rows of fingers and engaged by said fingers when the pins are moved and enter holes in said card.

16. In a machine for gang sensing a master card and punching information therefrom into a detail card, a sensing unit, a punching unit, a source of power, a series of commutator contacts on the punching unit connected thereto, a plug board on said punching unit, a series of connections thereon joined to the contacts of the commutator, a second series of connections on said plug board, joined to the sensing unit, a series of primary and secondary relays related to the sensing unit and punch magnets operated by said relays.

17. In a machine for gang sensing a master card and punching information therefrom into a detail card, a sensing unit comprising a series of contact members and common contact bars, a punching unit, a source of power connected to a series of contacts on a commutator on the punching unit, a plug board on said punching unit, a series of connections thereon joined in order to the contacts of the commutator, a second series of connections on said plug board joined in order to columns of contacts on the sensing unit, a series of primary and secondary relays related in order to the common bars of the sensing unit, and punch magnets operated by said relays.

18. In a machine for gang sensing a master card and punching information therefrom into a detail card, a sensing unit comprising a series of contact members and common contact bars, a punching unit, a source of power connected to a series of contacts on a commutator on the punching unit, a plug board on said punching unit, a series of connections thereon joined in order to the contacts of the commutator, a second series of connections on said plug board joined in order to columns of contacts on the sensing unit, a series of primary and secondary relays related in order to the common bars of the sensing unit, punch magnets operated by said relays, a plurality of series of other connections on the plug board, switches in each of said plurality of connections and adapted to be closed by an operator's key at the sensing unit, and flexible connectors available to the operator to make desired connections between the various rows of connections to connect up selected columns of the master card with selected columns of the detail card in the punch unit.

19. In a machine for gang sensing a master card and punching information therefrom into a detail card, a sensing unit including a contact finger, a punching unit including a commutator contact, a plug board on the punching unit, a connection on the plug board joined to the contact on the commutator, a second connection on the plug board joined to the contact finger on the sensing unit, a third and fourth connection on the plug board, the third connection joined to the first connection on the plug board at the will of the operator, and the fourth connection joined to the second connection on the plug at the will of the operator, and switching means disposed between the third and fourth connections on the plug board and closed by operation of a key on the sensing unit.

20. In a machine for gang sensing a master card and punching information therefrom into a detail card, a sensing unit including a series of contact fingers, a punching unit including a series of commutator contacts, a plug board on the punching unit, a group of connections on the plug board joined to the contacts on the commutator, a second group of connections on the plug board joined to the contact fingers on the sensing unit, third and fourth groups of connections on the plug board, switching means disposed between the third and fourth group of connections on the plug board and closed by the operation of a key on the sensing unit, and connectors available to the operator to join certain of the first and second groups of connections, to join certain of the first group of connections to certain of the third group of connections, and to join certain of the fourth group of connections to certain of the third group of connections.

21. In a machine for gang sensing a master card and punching information therefrom into a detail card, a sensing unit including a starting motor of the electromagnetic make and break type, a motor shaft, a series of cams on the shaft, circuit switches controlling power to the motor controlled by said cams, one switch closed when the shaft is in starting position, another switch closing shortly after the first one when the shaft starts to turn and breaking at the half rotation, a third switch closed at the half turn point, a fourth switch closing after the third switch and breaking at the complete turn point, a fifth switch closing just before the end of the complete cycle, a key board on the sensing unit, a key thereon to energize the motor through the first cam and another key on the sensing unit to energize the motor through the third cam, and an eject mechanism on the sensing unit activated by the operation of the fifth cam to eject the master card from the sensing unit.

22. In a machine for gang sensing a master card and punching information thereon into a detail card, a sensing unit, a punching unit separated therefrom but electrically connected thereto, a punch keyboard and a control keyboard on the sensing unit, a plug board on the punching unit, connections between the sensing unit, the punching unit and the plug board, and means controlled by the operation of keys on the control board and selected and made effective by the operator through the plug board to sense information from one of several fields on the master card and punch it into predetermined fields of the detail card.

23. In a machine for gang sensing a master card and punching information therefrom into a detail card, a sensing unit, a punching unit, a plug board, a commutator on the punching unit, a control key board on the sensing unit, a regular punch key board on the sensing unit, connecting means selected and made effective by the operator to connect certain fields on the master card with certain contacts on the commutator and means operated by keys on the control board to select one of said fields for transmission of information from the one card to the other.

24. In a device of the class described, a casing having a card passage therein, a pin in the casing to sense the card, means, including a rock shaft, to move said pin, a switch mechanism mounted on said shaft and having a pair of normally open contacts, means engaged by one of said contacts, when the shaft is rocked in one direction, and adapted to be projected into the casing across the card passage, the relation of the rock angle of the shaft and the spacing of the contacts being such that the contacts are closed when the engaged means encounters a card and are open when no card is in the passage.

25. In a device of the class described, a casing having a card passage therein, and slots thereon extending into said casing, a supporting plate on the outside of the casing, dependent fingers on the plate and extending into the slots and across said card passage, said fingers normally disposed against the ends of the slots and acting as limiting means for a card inserted into the passage, a linkage connected to said plate and means actuated at will and connected to said linkage to actuate said plate to move the card at least partly out of the end of the passage whereby it may be manually removed therefrom.

26. In a machine of the class described, means for gang-sensing a master card and making circuit contacts for those index positions of the card which are punched, a punch mechanism including a traveling carriage moving step by step, a commutator on the punch mechanism having contacts for each column of the card, brushes moving with the carriage to engage these contacts column by column, a source of power connected to the brushes, a plug board, one side of the circuit contacts in the sensing means connected to punch magnets, the other side of said contacts connected to the plug board, the columnar contacts on the commutator connected to the plug board, and flexible connectors manipulated by the operator to connect at will desired columns of the commutator with desired columns of the contacts in the sensing means.

27. In a machine of the class described, a series of punch magnets, a commutator on a punch frame, means for gang-sensing a master card and disposed between the commutator and the magnets, means under control of the operator to make desired variable connections between the commutator and the sensing means, a motor means for operating the sensing means, power control cams operated cyclically by said motor, control keys operable to move said cams through a half cycle of movement to sense the master card, a trip key on the punch adapted when operated to energize said motor for the second half of the cam cycle to restore the cams to normal, means also operated by the trip key to restore all control keys to normal, and a card eject mechanism operated to eject a card from the sensing means when the trip key is operated.

28. In a machine of the class described, the combination of a sensing unit for gang-sensing master cards disposed in one location, a detail card punch in a remote location but electrically connected thereto, a keyboard at the sensing unit and connected to the punch, a trip key at the keyboard to actuate the punch to punch the detail card after the information has been entered into the punch, means to open the sensing circuit when the trip key is actuated, and means to partially eject the master card from the sensing unit when the trip key is actuated.

29. In a machine of the class described, the combination of a sensing unit for gang-sensing a master card disposed in one location, a detail card punch in a remote location but electrically connected thereto, a keyboard at the sensing unit and connected to the punch, a reject key at the keyboard and operable when the punch is at rest, means to open the sensing circuit when the reject key is operated, and means to eject the master card from the sensing unit when the reject key is operated.

30. In a machine of the class described, the combination of a sensing unit for gang-sensing a master card disposed in one location, a detail card punch in a remote location but electrically connected thereto, a keyboard at the sensing unit and connected to the punch, the keyboard having a trip key, a reject key, field selection keys and a non-select key, all disposed in the circuit between the sensing unit and the punch, means for associating a field of the master card with the punch when a field selection key is operated and for disabling the other field selection keys when the desired key is operated, means for starting the sensing operation when a field selection key is operated and a master card is in the sensing unit, means for disabling the circuits of the field selection keys when the trip or reject key operated, and means for actuating the punch from the sensing unit by the operation of the non-select key when field selection is not employed.

31. In a machine of the class described, the combination of a sensing unit for gang-sensing a master card disposed in one location, a detail card punch in a remote location but electrically connected thereto, a punch keyboard on the sensing unit and a sensing control keyboard also thereat, a transfer relay disposed between the punch keyboard and the punch for ordinary punch operations therefrom, and circuit means associated with the transfer relay to disable the punch keyboard when the sensing unit is operating and for disabling the sensing unit when the punch keyboard is being operated.

References Cited in the file of this patent

UNITED STATES PATENTS

| | | |
|---|---|---|
| 1,105,920 | Potts | Aug. 4, 1914 |
| 1,839,402 | Lorant | Jan. 5, 1932 |
| 1,898,321 | Strobel | Feb. 21, 1933 |
| 2,018,420 | Robinson | Oct. 22, 1935 |
| 2,046,082 | Mills | June 30, 1936 |
| 2,172,758 | Rice | Sept. 12, 1939 |
| 2,346,267 | Mills | Apr. 11, 1944 |
| 2,394,604 | Ford | Feb. 12, 1946 |
| 2,569,805 | Doty | Oct. 2, 1951 |
| 2,623,592 | Knutsen | Dec. 30, 1952 |
| 2,647,581 | Gardinor et al. | Aug. 4, 1953 |

FOREIGN PATENTS

| | | |
|---|---|---|
| 882,138 | France | May 18, 1943 |